(12) United States Patent
Kang

(10) Patent No.: US 6,404,458 B1
(45) Date of Patent: Jun. 11, 2002

(54) APPARATUS FOR CONVERTING SCREEN ASPECT RATIO

(75) Inventor: Kyung Jin Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/094,587

(22) Filed: Jun. 15, 1998

Related U.S. Application Data

(63) Continuation-in-part of application No. 08/671,642, filed on Jun. 28, 1996.

(30) Foreign Application Priority Data

Jun. 28, 1995 (KR) .......................................... 95-17891

(51) Int. Cl.[7] .............................................. H04N 11/00
(52) U.S. Cl. ...................................... 348/445; 348/556
(58) Field of Search ................................ 348/445, 581, 348/556, 558, 704, 714

(56) References Cited

U.S. PATENT DOCUMENTS

| | | | | |
|---|---|---|---|---|
| 5,386,236 A | * | 1/1995 | Hong | 348/445 |
| 5,420,641 A | | 5/1995 | Tsuchida | |
| 5,528,305 A | * | 6/1996 | Kim | 348/445 |
| 5,534,934 A | | 7/1996 | Katsumata et al. | |
| 5,537,149 A | | 7/1996 | Teraoka et al. | |
| 5,635,985 A | | 6/1997 | Boyce et al. | |
| 5,793,434 A | * | 8/1998 | Lea | 348/445 |
| 6,104,865 A | * | 8/2000 | Hamaguchi et al. | 386/123 |

FOREIGN PATENT DOCUMENTS

JP 6189218 7/1994

\* cited by examiner

*Primary Examiner*—Victor R. Kostak
(74) *Attorney, Agent, or Firm*—Birch, Stewart, Kolasch & Birch, LLP

(57) ABSTRACT

An improved screen aspect ratio conversion which is capable of horizontally compressing and extending two image signals by writing in/reading from two line memory units when the wide screen television having an aspect ratio of 16:9 receives a 4:3 image signal or a 2:1 cinema image signal, thus simplifying the construction of the system, which includes a first line memory unit for receiving a clock of the clock generator as a writing/reading clock in accordance with the first writing enable signal of the clock counter and the first reading enable signal of the coefficient controller and for writing/reading at every line the image data inputted; a sample interpolation unit for performing 4:3 or 7:8 interpolation in accordance with the current image data inputted from the first line memory unit and the previous image data and for selecting at every line the interpolated data in accordance with a coefficient control signal of a predetermined bit generated by the coefficient controller; a second line memory unit for receiving the clock of the clock generator as a writing/reading clock in accordance with the second writing enable signal generated by the coefficient controller and the previously set second reading enable signal and for writing the image data interpolated by the sample interpolation unit at every line.

23 Claims, 16 Drawing Sheets

FIG. 6

| 204a | C2 | C1 | C0 | N2 | N1 | N0 | WE2 | RE1 |
|---|---|---|---|---|---|---|---|---|
| 0 | 0 | 0 | 0 | 0 | 0 | 0 | 1 | 1 |
| 1 | 0 | 0 | 1 | 0 | 1 | 1 | 1 | 0 |
| 2 | 0 | 1 | 0 | 1 | 0 | 1 | 1 | 1 |
| 3 | 0 | 1 | 1 | 1 | 1 | 0 | 0 | 1 |
| 4 | 1 | 0 | 0 | 0 | 0 | 0 | 1 | 1 |
| 5 | 1 | 0 | 1 | 0 | 1 | 1 | 1 | 1 |
| 6 | 1 | 1 | 0 | 1 | 0 | 1 | 1 | 1 |
| 7 | 1 | 1 | 1 | 1 | 1 | 0 | 0 | 1 |
| 8 | 0 | 0 | 0 | 0 | 0 | 0 | 1 | 1 |
| ⋮ | ⋮ | ⋮ | ⋮ | ⋮ | ⋮ | ⋮ | ⋮ | ⋮ |

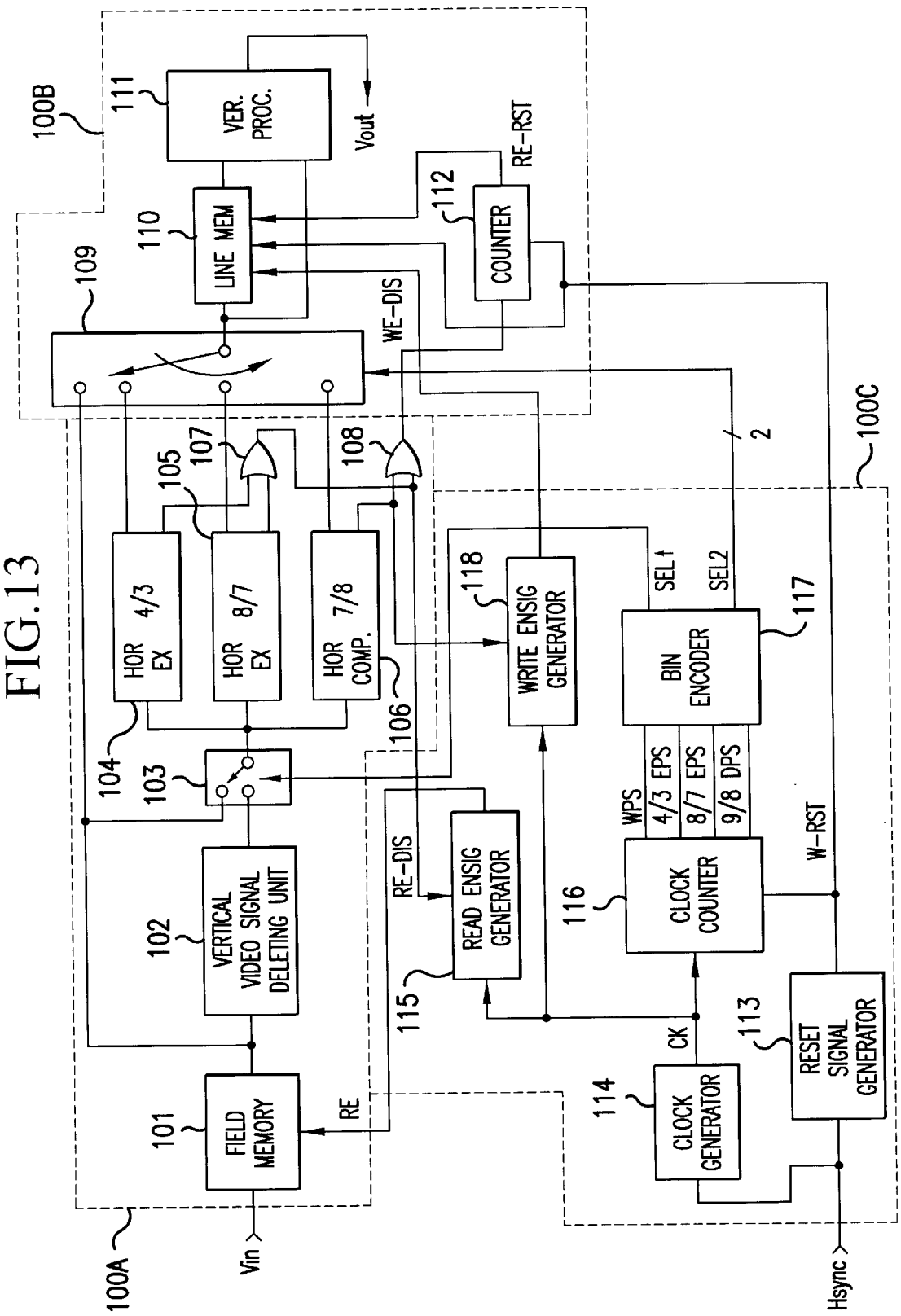

Vin

ACTIVE WIDTH

COMPRESSED ACTIVE WIDTH

RE-DIS

SP-EN

LEFT SIDE LINE WIDTH   RIGHT SIDE LINE WIDTH

APPARATUS FOR CONVERTING SCREEN ASPECT RATIO

This application is a Continuation In Part of application Ser. No. 08/671,642 filed Jun. 28, 1996, the entire contents of which are hereby incorporated by reference.

BACKGROUND OF THE INVENTION

1. Field of the Invention

The present invention relates to an apparatus for converting a screen aspect ratio, and particularly to an improved apparatus for converting a screen aspect ratio, which is capable of horizontally compressing a 4:3 video signal and horizontally extending a 2:1 video signal by varying the scanning line of a screen, when a wide screen television having a 16:9 aspect ratio receives a 4:3 video signal or a 2:1 video signal.

2. Description of Related Art

Generally, in the national television system committee (NTSC) and the phase alternating line (PAL), a letter box type signal is transmitted by forming a low band image as much as 3/4 of the original active region (the effective image region) and blacking the upper and lower portions or the left- and right-side portions of the screen of the television.

The transmission of the letter box signal is directed to displaying the image having a screen aspect ratio of 16:9 on the screen of the television having a 4:3 screen aspect ratio without torsion of the image.

However, as the wide screen television having a screen aspect ratio of 16:9 is introduced, it is needed to display the image of a screen aspect ratio of 4:3 on the wide screen television having a screen aspect ratio of 16:9.

Therefore, the television broadcasting station concurrently transmits a 4:3 aspect ratio program in order for the television having a function of receiving a 4:3 aspect ratio screen signal and the television having a function of receiving a 16:9 aspect ratio screen signal to selectively receive a corresponding television program transmitted from the television broadcasting station.

In addition, the television is equipped with a device for automatically detecting a wide screen signal (WSS) which is referred to the 4:3 program or the 16:9 program. Here, the screen of the television should be varied in accordance with the received signal.

However, in order to receive the 4:3 program transmitted from the television broadcasting station on the wide screen television having an aspect ratio of 16:9, it is necessary to horizontally compress the scanning line of the screen, and when receiving the 2:1 cinema signal, the scanning line of the screen should be horizontally extended.

FIG. 1 shows the conventional apparatus for converting a screen aspect ratio, which is directed to displaying the 4:3 video signal or the 2:1 cinema video signal on the wide screen television having the 16:9 screen aspect ratio.

As shown therein, there are provided a clock generator 102 for generating a clock signal CLK1 when a horizontal synchronous signal Hsy is inputted thereto through a synchronous input terminal 101 for a horizontal compression and expansion, a clock counter 103 for counting the clock signal CLK1 generated by the clock generator 102 and for outputting the counted value, an elimination image range judging unit 104 for comparing the previously set reference value with the clock counting value of the clock counter 103, eliminating as much as 1/18 of the image of the left-side and right-side image in the 16:9 screen in accordance with the comparison result, and generating a clock selection control signal S1 and a writing enable signal WE so as to display the 2:1 cinema video signal, an effective image range judging unit 105 for comparing the clock counting value of the clock counter 103 with the previously set reference value, judging the effective image range value and the horizontal scanning line range in accordance with the comparison result, and generating a clock selection control signal S2 and a side panel selection control signal SPC for horizontally compressing the image in accordance with the judging result, a frequency multiplier 106 for multiplying the clock signal CLK1 outputted form the clock generator 102 by 4/3 and for generating a clock signal CLK2, a frequency multiplier 107 for multiplying the clock signal CLK1 generated by the clock generator 102 by 8/9 and for generating a clock signal CLK3, a clock selector 108 for being switched in accordance with a control signal S1 generated by the elimination image range judging unit 104 and for selecting either the clock signal CLK1 of the clock generator 102 or the clock signal CLK3 of the frequency multiplier 107, a clock selector 109 for being switched in accordance with the clock selection control signal S2 generated by the effective image range judging unit 105 and for selecting either the clock signal CLK2 which is multiplied by 4/3 by the frequency multiplier 106 or the clock signal selected by the clock selector 108, an edge detector 110 for detecting a rising edge of the horizontal synchronous signal Hsy outputted from the synchronous input terminal 101 and for generating a reset signal RST whenever the rising edge is detected, a line memory unit 111 for being enabled in accordance with a writing enable signal WE generated by the elimination image range judging unit 104, receiving the clock signal CLK1 generated by the clock generator 102 as the writing clock signal, receiving the clock signal selected by the clock selector 108 as a reading clock signal, storing and outputting the digital image data of 8 bits inputted thereto through the image input terminal 100 at every line, being reset in accordance with the reset signal RST generated by the edge detector 110, and writing/reading the image data of the next line, a line memory unit 112 for receiving the clock signal selected by the clock selector 108 as a reading clock signal, storing and outputting the image data outputted from the line memory unit 111 at every horizontal line, being reset in accordance with a reset signal RST generated by the edge detector 110 and for writing/reading the image data of the next line, and a side panel insertion until 113 for outputting the horizontally converted digital image data through the output terminal 114 by inserting a luminance level value of a temporary side panel to the image data which is inputted thereto at every line from the line memory unit 112 in accordance with a side panel selection control signal SPC of the effective image range judging unit 105.

The operation of the conventional apparatus for converting a screen aspect ratio will now be explained with reference to the accompanying drawings.

First, the horizontal compression process of the television image will now be first described with reference to FIG. 2A.

When the horizontal synchronous signal Hsy is inputted into the clock generator 102 through the synchronous input terminal 101, the clock generator 102 generates the clock signal CLK1 whenever the horizontal synchronous signal Hsy is inputted from the synchronous input terminal 101 so as to horizontally compress the digital image data inputted thereto through the image input terminal 100 and then outputs the clock signal CLK1 to the clock counter 103, the frequency multipliers 106 and 107, the clock selector 108 and the line memory unit 111, respectively.

The frequency multiplier 106 multiplies the clock signal CLK1 inputted from the clock generator 102 by 4/3, generates the clock signal CLK2, and outputs the clock signal CLK2 to the clock generator 109.

The frequency multiplier 107 multiplies the clock signal CLK1 inputted from the clock generator 102 by 8/9 and then generates the clock signal CLK3, and outputs the clock signal CLK3 to the clock generator 108.

In addition, the clock counter 103 counts the start portion of the clock signal CLK1 inputted from the clock generator 102 at every line, and outputs the counted value to the elimination image range judging unit 104 and the effective image range judging unit 105, respectively.

The elimination image range judging unit 104 compares the value counted by the clock counter 103 with the previously set reference value so as not to eliminate the left and right sides of the image when the screen aspect ratio is 4:3, generates the clock selection control signal S1 and the writing enable signal WE in accordance with the comparison result, outputs the clock selection control signal to the clock generator 108, and outputs the clock selection control signal S1 to the line memory unit 111.

In addition, the effective image range judging unit 105 compares the counted value inputted from the clock counter 103 with the previously set reference value, and separates the horizontal scanning line range and the effective image range in accordance with the comparison result.

Namely, when reading the video signal stored in the line memory unit 112, it is necessary to make the speed of the clock signal be different by separating the range of the horizontal scanning time into one range in which the compression is needed and another range in which the compression is not needed.

The range in which the compression is not needed is referred to the range of the horizontal scanning line range in which the horizontal synchronous signal exists, so that the compression should not be conducted.

The effective image range judging unit 105 is directed to separating the horizontal scanning time range into the horizontal scanning line range and the effective image range by comparing the counted value of the clock counter 103 with the previously set reference value, outputting the clock selection signal S2 to the clock selector 109 so as to vary the reading clock speed of the line memory unit 112 in accordance with the separated result, generating the side panel selection control signal SPC and then outputting the signal SPC to the side panel insertion unit 113.

The clock selector 108 is switched in accordance with the clock selection control signal S1 outputted from the elimination image range judging unit 104, blocks the clock signal CLK3 which is multiplied by 8/9 by the reference multiplier 107, selects the clock signal CLK1 generated by the clock generator 102, and then outputs the selected clock signal to the clock generator 109 and the line memory units 111 and 112, respectively.

In addition, the clock selector 109 is switched in accordance with the clock selection control signal S2 outputted from the effective image range judging unit 105, alternately selects the clock signal CLK2 multiplied by 4/3 by the frequency multiplier 106 and the clock signal CLK1 selected by the clock selector 108 and then outputs the selected clock signal to the line memory 112.

At this time, when the digital image data is inputted through the image input terminal 100, the line memory unit 111 is enabled in accordance with the writing enable signal WE outputted from the elimination image range judging unit 104, receives the clock signal CLK1 outputted from the clock generator 102 as the writing clock, stores the digital image data of 8 bits outputted from the image input terminal 100 at every line, receives the clock signal CLK1 selected by and outputted from the clock selector 108 (namely, the writing clock of the line memory unit 111 as the reading clock), and outputs the stored image data to the line memory unit 112 at every line.

Finally, the line memory unit 111 writes and reads using the clock signal CLK1 generated by the clock generator 102, which is delayed by 1H (the horizontal scanning period). The variation of the input/output image data is not made.

Meanwhile, the edge detector 110 detects the rising edge of the horizontal synchronous signal Hsy and generates the reset signal RST whenever the edge is detected.

The line memory unit 111 is initialized in accordance with the reset signal RST generated by the edge detector 110, and the image data of the next line is written and read in the same manner as previously explained.

Meanwhile, the line memory unit 112 receives the clock signal CLK1, which is referred to the reading clock of the line memory unit 111 selected and outputted by the clock selector 108, as the writing clock, writes the image data outputted from the line memory unit 111 at every line, receives the clock signal CLK1 alternately outputted by the clock selector 109 and the second clock signal CLK2 which is multiplied by 4/3 with respect to the clock signal CLK1, performs the FIFO process with respect to the stored image data at every horizontal scanning line, and outputs the results to the side panel insertion unit 113.

Namely, in order to horizontally compress the image data into the 4:3 data, the clock selector 109 selects the clock signal which is used as the writing clock of the line memory unit 112, which is referred to as the clock signal CLK1 selected by the clock selector 108, when the clock selection control signal S2 of the effective image range judging unit 112 is referred to the horizontal scanning line so as to read the image data of the line memory unit 112, and reads the image data stored in the line memory unit 112. No variation of the image data is made at this time.

In addition, when the clock selection control signal S2 of the effective image range judging unit 105 is referred to the effective image range, the clock signal CLK2, which is multiplied by 4/3 by the first frequency multiplier 107, is selected, and the image data stored in the line memory unit 112 is read, so that as shown in FIG. 2A, in the effective image range, the aspect ratio is maintained as 4:3 in the screen having a 16:9 aspect ratio.

In addition, as shown in FIG. 2A, in the screen having a 16:9 aspect ratio, in order to insert the side panels LSP and RSP into the left-side and right-side except for the effective image range of 4:3 (namely, into the left-side and right-side of the image signal which is compressed to 4/3 ), the luminance level value of "0" is inserted into the left-side and right-side panels LSP and RSP in accordance with the side panel selection control signal SPC, which is generated by the effective image range judging unit 105.

Namely, the side panel insertion unit 113 selects the image data of the line memory unit 112 and then outputs the selected image data through the output terminal 114 when the side panel selection control signal SPC obtained by the effective image range judging unit 105 is referred to the effective image range, and when the side panel selection control signal SPC is not referred to the effective image range, the luminance level value of the ground voltage is selected and inserted at both sides of the effective image range, and then is outputted through the output terminal 114.

Therefore, as shown in FIG. 2A, the screen compressed to 4:3 is displayed on the screen having an aspect ratio of 16:9.

Meanwhile, in the wide screen television having an aspect ratio of 16:9, the horizontal extension (expansion) of the cinema image signal such as 2:1 is performed as follows.

First, when the digital image data inputted through the image input terminal 100 is written in the line memory unit 111 at every horizontal line as the clock signal CLK1 generated by the clock generator 102, and is read from the line memory unit 111. The reading is performed using one clock signal selected by the clock selector 108 between the clock signal CLK1 generated by the clock generator 102 and the clock signal CLK3 which is multiplied by 8/9 by the frequency multiplier 107.

Here, in the clock selector 108, a control signal for selecting the clock signal CLK1 of the clock generator 102 and the clock signal CLK3 of the frequency multiplier 107 is referred to the clock selection control signal S1 generated by the elimination image range judging unit 104.

Namely, in order to display the image such as the cinema signal of an aspect ratio of 2:1 on the screen of 16:9, as shown in FIG. 2B, the left-side and right-side of the image should be eliminated by 1/18, respectively. Here, the elimination image range judging unit 104 compares the count value from the clock counter 103 with the previously set reference value and disables the writing enable signal WE of the line memory unit 111 in the side panel ranges LSP1 and RSP1, so that the image data is not written in the line memory unit 111 for those ranges.

In addition, the clock selector 108 selects the clock signal CLK3 which is multiplied by 8/9 by the frequency multiplier 107 in accordance with the clock selection control signal S1 of the elimination image range judging unit 104 in the effective image range as similar to the horizontal compression, and reads the image data stored in the line memory unit 111.

Therefore, the image data read in the effective image range is referred to 16/18 of the original image signal, and is read by 8/9 as the clock signal CLK3, so that the left-side and right-side of the screen having an aspect ratio of 16:9 become identical.

In addition, the signal from 1/18 of the left-side and right-side written in the line memory unit 111 is not automatically read, but is reset in accordance with the rising edge of the horizontal synchronous signal Hsy inputted from the synchronous input terminal 101 (namely, in accordance with the reset signal RST generated by the edge detector 110), and then is returned to the.next line.

In addition, the effective image range judging unit 105 selects the clock signal CLK3 that the clock selector 109 selected from the clock selector 108 in accordance with the clock selection control signal S2 of the effective image range judging unit 105. That is, the effective image range judging unit 105 selects the writing clock of the line memory unit 112, reads the image data stored in the line memory unit 112, and then outputs the image data to the side panel insertion unit 113.

Namely, it is possible to read the horizontally extended scanning line using the reading clock and the writing clock of the line memory unit 112.

In addition, the side panel insertion unit 113 selects the image data read by the line memory unit 112 in accordance with the side panel selection control signal SPC outputted from the effective image range judging unit 105 and then outputs it through the output terminal 114.

Therefore, as shown in FIG. 2B, it is possible to display the cinema image signal which is horizontally extended to 2:1 on the screen having an aspect ratio of 16:9.

In order to compress or expand the image signal inputted through the image input terminal 100, two line memory units 111 and 112 are connected in series. To horizontally compress the image signal, only one the line memory unit 112 is necessary. In addition, to horizontally expand the image signal, two line memory units 111 and 112 are needed.

However, the conventional apparatus for converting a screen aspect ratio is basically directed to a horizontally compressing and extending method. Since the above-mentioned conventional art uses the clock circuit without using the digital filter, the compression ratio and extension ratio of the clock signal used in two line memory units are different from each other. Therefore, whenever the compression ratio of the clock signal becomes different, the clock signal corresponding to the speed thereof is needed, so the clock circuit including two frequency multipliers, the clock counter, the clock generator, and the like are needed. Therefore, the construction of the conventional system is complex, it is difficult to control the clock, and the operation of the conventional system is unstable.

SUMMARY OF THE INVENTION

Accordingly, it is an object of the present invention to provide an apparatus for converting a screen aspect ratio which overcomes the problems encountered in conventional apparatuses for converting a screen aspect ratio.

It is another object of the present invention to provide a screen aspect ratio conversion, which is capable of horizontally compressing and extending (expanding) two image signals by writing in or reading from two line memory units when the wide screen television having an aspect ratio of 16:9 receives a 4:3 image signal or a 2:1 cinema image signal, thus simplifying the construction of the system.

It is another object of the present invention to provide a screen aspect ratio conversion by which the system is operated more stably by horizontally compressing and extending the image using a single clock, whereby the construction of the system is simplified.

It is another object of the present invention to provide a screen aspect ratio conversion by which it is possible to variously compress and extend the image signal using a simpler construction of the system.

It is another object of the present invention to provide a screen aspect ratio conversion by which it is possible to horizontally and vertically compress and extend the image signal using a line memory instead of a sample memory and using a field memory instead of a line memory.

It is another object of the present invention to provide a screen aspect ratio conversion by which it is possible to vary the aspect ratio of the image signal using a single clock.

To achieve the above and other objects, there is provided an apparatus for converting a screen aspect ratio, which includes a clock generator for generating a clock signal whenever a horizontal synchronous signal is inputted; a clock counter for counting the clock signal of the clock generator within a predetermined range and for generating a first writing enable signal; a coefficient controller for counting the clock signal obtained by the clock generator at every sample in accordance with a coefficient selection signal contained in the horizontal synchronous signal and inputted thereto in accordance with a horizontal compressing mode and a horizontal extending mode, generating a coefficient value of a predetermined bit, selecting a coefficient value of a predetermined bit, generating a coefficient control signal of a predetermined bit, logically processing the generated coefficient value and the coefficient selection signal, and generating a first reading enable signal and a second writing enable signal; a first line memory unit for receiving a clock signal of the clock generator as a writing/reading clock signal in accordance with the first writing enable signal of the clock counter and the first reading enable signal of the coefficient controller and for writing/reading at every line the image data inputted; a sample interpolation unit for performing 4:3 or 7:8 interpolation in accordance with the current image data inputted from the first line memory unit and the previous image data and for selecting at every line the interpolated data in accordance with a coefficient control signal of a predetermined bit generated by the coefficient controller; a second line memory unit for receiving the clock signal of the clock generator as a writing/reading clock signal in accordance with the second writing enable signal generated by the coefficient controller and the previously set second reading enable signal and for writing the image data interpolated by the sample interpolation unit at every line.

It is another object of the present invention to provide a spectacle screen using an apparatus for converting screen aspect ratios.

To further achieve the above and other objects, there is provided an appratus for converting a screen aspect ratio which includes a video signal size converting unit for receiving an input video signal and outputting an output signal for a wide screen mode by adjusting a line memory and expanding or compressing the input video signal at a predetermined ratio based on a horizontal size of a screen; a spectacle video signal outputting unit for selecting a predetermined video signal from the output video signals from the video signal size converting unit, controlling a read/write operation of the line memory based on a changing degree of a horizontal size of the selected video signal and generating a digital output video signal in which the number of horizontal pixels is changed by a screen section; and control signal generating unit for generating a read enable signal enabling the field memory based on a horizontal synchronous signal and for generating selection signals according to a wide screen section, an expanded screen section and a compressed screen section and outputting the read enable signal and the selection signals to the video signal size converting unit and the spectacle video signal outputting unit.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 6 is a table showing an output signal of a counter and an output signal of an enable signal generator of FIG. 4 according to the present invention;

FIG. 13, is a detailed block diagram of the apparatus of FIG. 12 according to the present invention;

DETAILED DESCRIPTION OF THE PREFERRED EMBODIMENTS

Figure 3:
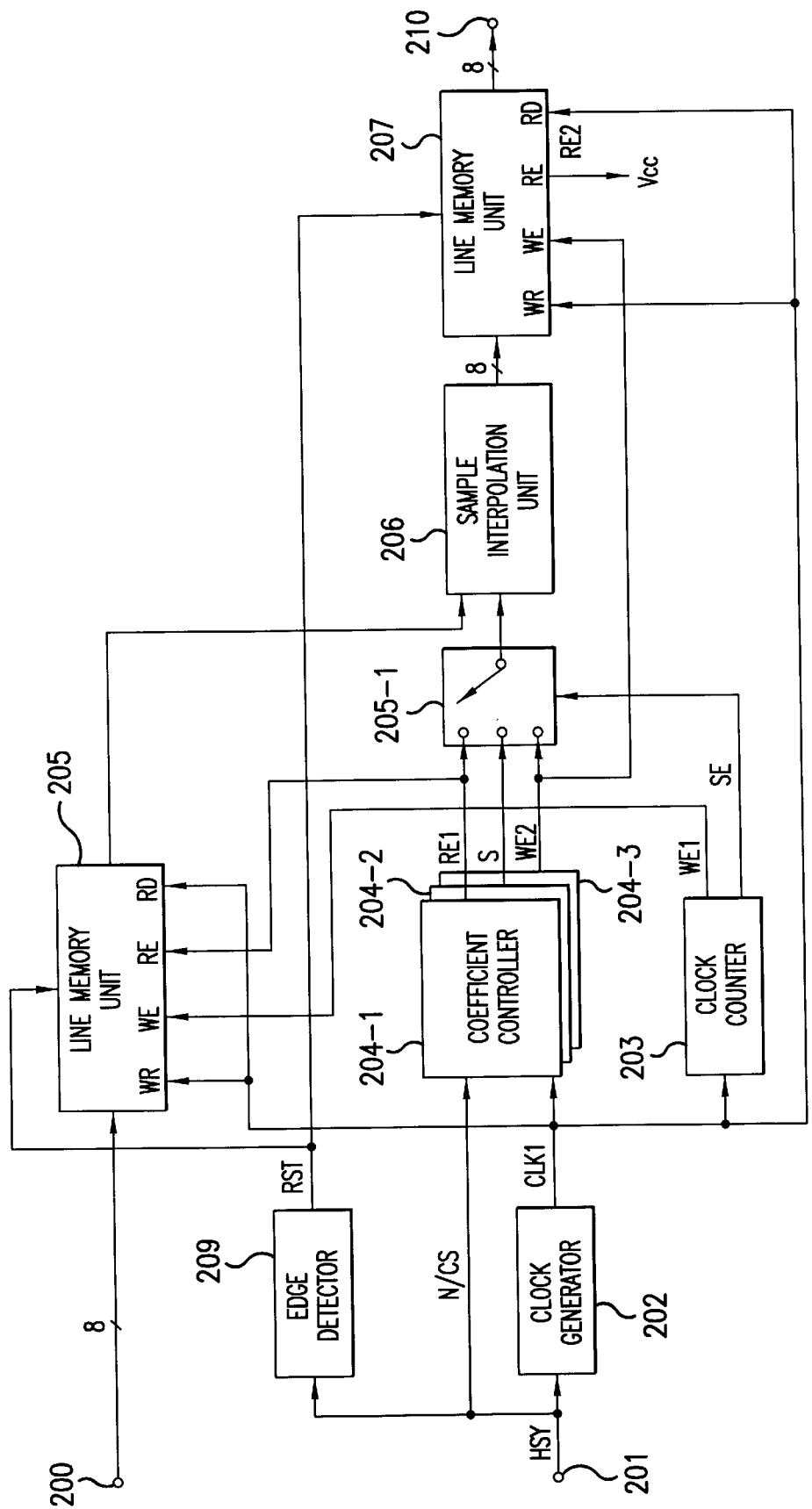
FIG. 3 is a block diagram showing an apparatus for converting a screen aspect ratio according to a first embodiment of the present invention.

FIG. 3 shows an apparatus for converting a screen aspect ratio according to the present invention, which includes a clock generator 202 for generating a clock signal CLK1 whenever a horizontal synchronous signal Hsy is inputted through a synchronous input terminal 201, a clock counter 203 for counting the clock signal CLK1 generated by the clock generator 202 by the set value and for generating a writing enable signal WE1, coefficient controllers 204-1 to 204-3 (204) for counting the clock signal CLK1 generated by the clock generator 202, creating a predetermined bit value, selecting the predetermined bit value in accordance with a coefficient selection signal N/CS contained in the horizontal synchronous signal Hsy in accordance with a horizontal compressing mode (a normal mode) and a horizontal extending mode (a cinema zoom mode), and generating a reading enable signal RE1, a writing enable signal WE2, and a coefficient control signal S of a predetermined bit, these signals being controlled coefficients for showing different scenes, a line memory unit 205 for receiving a clock signal CLK1 of a clock generator 202 as a writing/reading clock WR/RD in accordance with a writing enable signal WE1 generated by the clock counter 203 and a reading enable signal RE1 generated by the coefficient controller 204 and for writing and outputting the digital image data inputted through the image input terminal 200, a selective unit 205-1 for selecting one of the controlled coefficients from the coefficient controller according to a selection signal SE from the clock counter 203, a sample interpolation unit 206 for sample-interpolating the current image data outputted from the line memory unit 205 at every line and the previous image data to 4:3 or 7:8 in accordance with the coefficient control signal S of a predetermined bit generated by the coefficient controller 204, a line memory unit 207 for receiving the clock signal CLK1 generated by the clock generator 202 as the writing/reading clocks WR/RD in accordance with the writing enable signal WE2 generated by the coefficient controller 204 and the fixed reading enable signal RE2, writing the image data sample-interpolated and inputted by the sample interpolation unit 206 at every line, and outputting the horizontally converted digital image data through the output terminal 210, and an edge detector 209 for outputting a reset signal RST to the line memory units 205 and 207 whenever the rising edge of the horizontal synchronous signal Hsy is detected through the synchronous input terminal 201.

Figure 4:
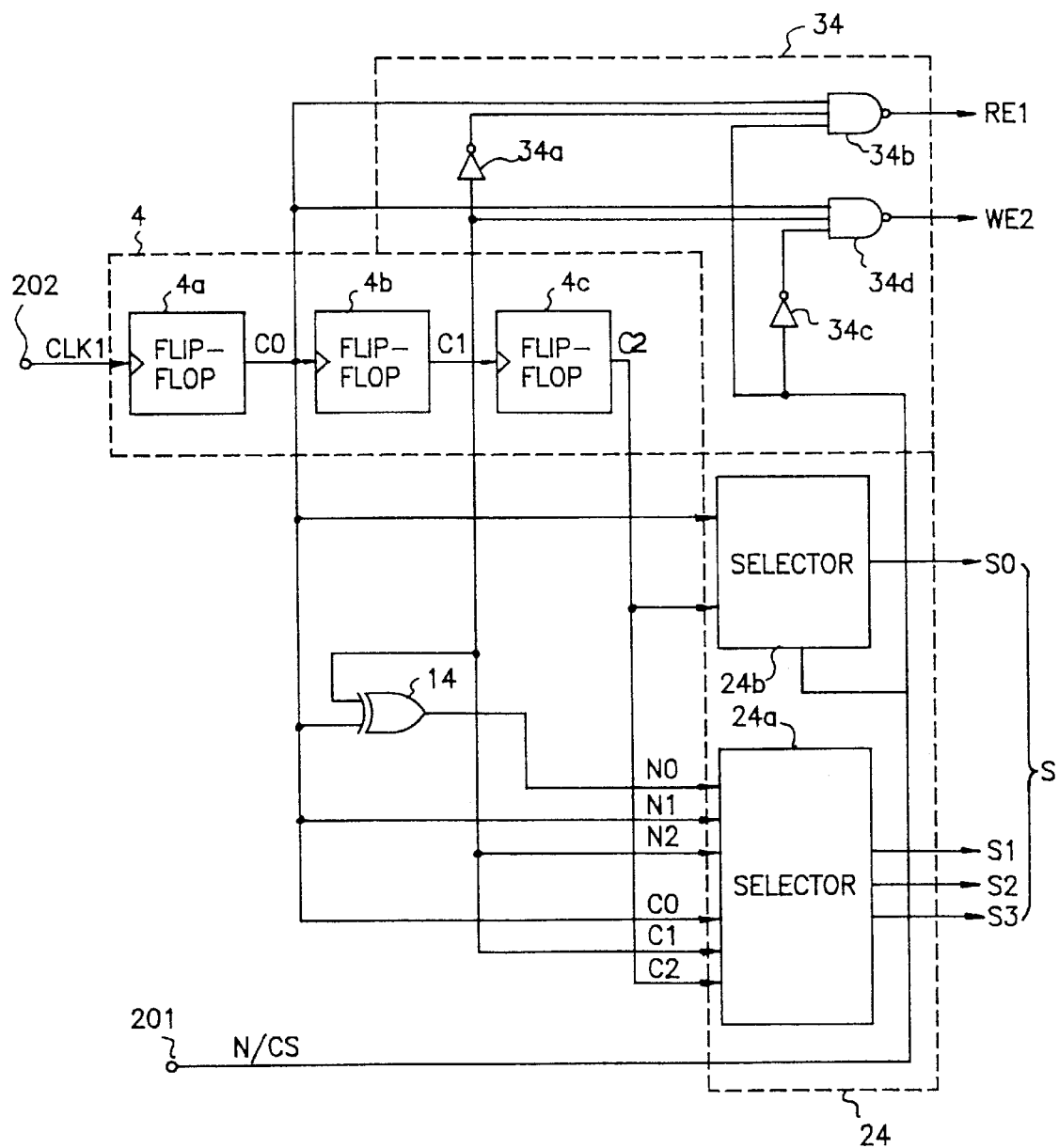
FIG. 4 is a block diagram showing a coefficient controller of FIG. 3 according to the present invention.

In addition, as shown in FIG. 4, the coefficient controller 204 includes a counter 4 for sequentially counting the clock signal CLK1 generated by the clock generator 202 using the flip-flops 4a–4c and for outputting three bit values C0–C2, an exclusive-OR gate 14 for exclusively ORing and outputting two bit values inputted from the flip-flops 4a and 4b of the counter 4, a multiplexer 24 for multiplexing two bit values or three bit values counted by the counter 4 and one bit value of the exclusive OR gate 14 so as to interpolate the image data and for generating coefficient control signals S0–S3 of different four bits, and an enable signal generator 34 for logically processing the two bit values among three bits counted by the counter 4 and the coefficient selection signal N/CS contained in the horizontal synchronous signal Hsy outputted from the synchronous input terminal 201.

The multiplexer 24 includes a selector 24a for receiving one bit value N0 which is exclusively ORed by the exclusive-OR gate 14 and three bit values counted by the flip-flops 4a–4c of the counter 4 as five bit values N1, N2, and C0–C2, selecting the bits in accordance with the coefficient selection signal N/CS among six bits, and outputting the selected bits as coefficient control signals S1–S3 of three bits, and a selector 24b for selecting one bit value C0 counted by the flip-flop 4a of the counter 4 and one bit value C3 counted by the flip-flop 4c and for generating as a coefficient control signal S0.

In addition, the enable signal generator 34 includes an inverter 34a for inverting one bit value Cl counted by the flip-flop 4b of the counter 4, a NAND gate 34b for NANDing one bit value C0 counted by the flip-flop 4a of the counter 4, one bit value of the inverter 34a, and the coefficient selection signal N/CS, an inverter 34c for inverting the coefficient selection signal N/Cs, and a NAND gate 34d for generating a writing enable signal WE2 by NANDing one bit values C0 and C1 counted by the flip-flops 4a and 4b of the counter 4 and the coefficient selection signal N/CS outputted from the inverter 34c.

Figure 5:
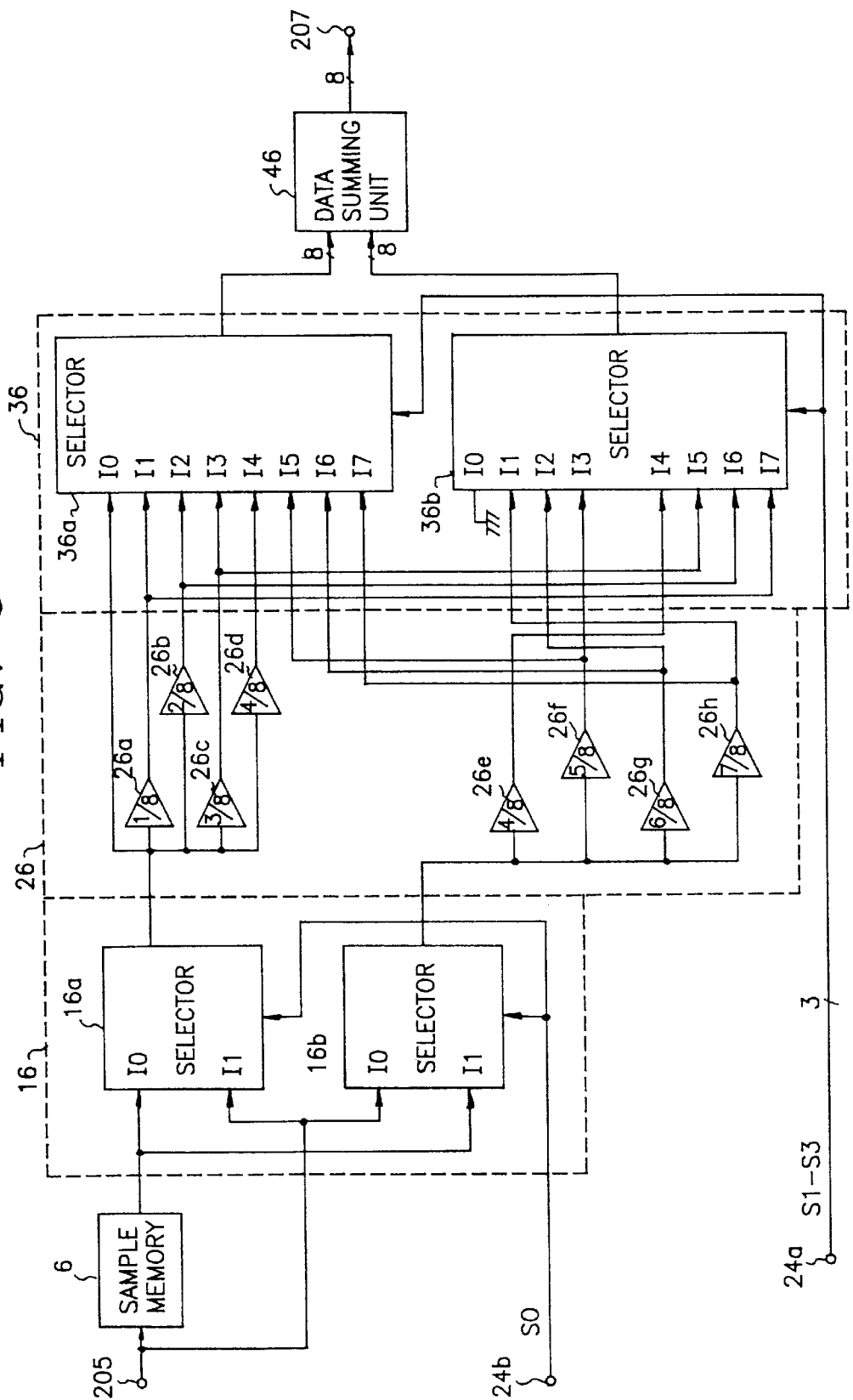
FIG. 5 is a block diagram showing a sample interpolation unit of FIG. 3.

As shown in FIG. 5, the sample interpolation unit 206 includes a sample memory 6 for storing the current image data outputted from the line memory unit 205 at every line, a multiplexer 16 for outputting the previous image data outputted from the sample memory 6 and the current image data outputted from the line memory unit 205 at every line in accordance with the coefficient control signal S0 of one bit selected by the multiplexer 24 of the coefficient controller 204 through the selectors 16a and 16b, a line multiplier 26 for multiplying and outputting the coefficient values which are differently set by the current or previous image data with respect to two lines obtained by the multiplexer 16, a multiplexer 36 for sequentially selecting the image data multiplied by the line multiplier 26 and the previous and current image data outputted from the multiplexer 16 in accordance with coefficient control signals S1–S3 of three bits outputted from the multiplexer 24 of the coefficient controller 204 and for outputting different values, and a data summing unit 46 for adding two image data of 8 bits which are multiplexed by the multiplexer 36 and for outputting the result to the line memory unit 207.

The line multiplier 26 includes multipliers 26a–26d for multiplying the current or previous image data outputted from the selector 16a of the multiplexer 16 by 1/8, 2/8, 3/8, 4/8, respectively, and multipliers 26e–26h for multiplying the current or previous image data outputted from the selector 16b of the multiplexer 16 by 4/8, 5/8, 6/8, 7/8, respectiely.

In addition, the multiplexer 36 includes a selector 36a for selecting the current and previous image data directly inputted thereto from the selector 16a and the image data multiplied by and outputted from the multipliers 26a–26d and 26f–26h of the line multiplier 26 at every line in accordance with the coefficient control signals S1–S3 of three bits outputted from the multiplexer 24 of the coefficient controller 204 and for outputting the same to the data summing unit 46, and a selector 36b for selecting the previously set ground voltage of one bit and the image data multiplied to the set value by the multipliers 26a–26c and 26e–26h of the line multiplier 26 and for outputting the result to the data summing unit 46.

The operation of the apparatus for converting the screen aspect ratio according to the present invention will now be explained with reference to FIGS. 6 through 8.

First, in order to compress or extend the image signal converted into a digital signal and inputted through the image input terminal 200, the image data writing and reading are performed with respect to the line memory units 205 and 207 in accordance with a single clock signal CLK1 generated by the clock generator, so that the image signal is horizontally compressed and extended.

Namely, when the horizontal synchronous signal Hsy is inputted to the clock generator 202 through the synchronous input terminal 201, the clock generator 202 generates a clock signal CLK1 so as to horizontally compress the digital image data inputted through the image input terminal 200 whenever the horizontal synchronous signal Hsy is inputted through the synchronous input terminal 201, and then outputs the clock signal CLK1 to the clock counter 203, the coefficient controller 204, and the line memories 205 and 207, respectively.

The clock counter 203 counts by the set value by receiving the clock signal CLK1 generated by the clock generator 202, and outputs the counted value to the line memory unit 205 as a writing enable signal WE1.

In addition, the coefficient controller 204 creates three bit values by counting the clock signal CLK1 generated by the clock generator 202, multiplexes and logically processes the created three bit values in accordance with a coefficient selection signal N/CS contained in the horizontal synchronous signal Hsy in accordance with a horizontal compressing mode (a normal mode) or a horizonal extending mode (a cinema zoom mode), and outputs a judging enable signal RE1, a writing enable signal WE2, and a coefficient control signal S of four bits.

Namely, as shown in FIG. 4, the counter 4 of the coefficient controller 204 includes three flip-flops 4a–4c and serves as a three bit counter for generating coefficient values C0–C2 of three bits by sequentially counting the clock signal CLK1 generated by the clock generator 202 and for counting the sample of the horizontal scanning line by four samples in case of the 4:3 interpolation. In addition, in case of the 7:8 interpolation, the sample is counted by eight samples, and then outputted to the exclusive-OR gate 14, the multiplexer 24, and the enable signal generator 34.

The exclusive-OR gate 14 exclusively ORs the bit values C0 and C1 counted by the flip-flops 4a and 4b of the counter 4 and outputs the result to the selector 24a of the multiplexer 24.

In addition, the selector 24a of the multiplexer 24 receives the value No exclusively ORed by the exclusive-OR gate 14 and the bit values C0 and C1 counted by the flip-flops 4a and 4b of the counter as upper three bit values N0–N2, receives the bit values C0–C2 of the flip-flops 4a–4c of the counter 4 as lower three bit values C0–C2, selects either the upper three bits C0–C2 or the lower three bits C0–C2 in accordance with the coefficient selection signal N/CS contained in the horizontal synchronous signal Hsy, and outputs coefficient control signals S1–S3 of three bits.

The selector 24b of the multiplexer 24 selects either the bit value C0 of the flip-flop 4a of the counter 4 or the bit value C2 of the flip-flop 4c in accordance with the coefficient selection signal N/CS and outputs the coefficient control signal S0 of one bit.

In other words, the coefficient selection signal N/CS contained in the horizontal synchronous signal Hsy logically becomes a low level in the horizontal compressing mode, and is then inputted to the selector 24a and 24b of the multiplexer 24, and in the horizontal extending mode, the coefficient selection signal N/CS contained therein logically becomes a high level and then is outputted to the selectors 24a and 24b.

The selector 24a selects three bit values N0–N2 outputted from the exclusive-OR gate 14 and the flip-flops 4a and 4b when the coefficient selection signal N/CS has a low level (namely, in the horizontal compressing mode), and outputs the selected bit values to the sample interpolation unit 206 using the coefficient control signals S1–S3. When the coefficient control signal N/CS has a high level (namely, in the horizontal extending mode), the selector 24a selects three bit values C0–C2 and outputs the result to the sample interpolation unit 206 using the coefficient control signals S1–S3.

The selector 24b selects he bit value C0 of the flip-flop 4a when the coefficient selection signal N/CS has a low level and outputs the selected value to the sample interpolation unit 206 using the coefficient control signal S0. When the coefficient control signal N/CS has a high level, the selector 24b selects the bit value C2 of the flip-flop 4c and outputs the same to the sample interpolation unit 206 using the coefficient control signal S0.

Meanwhile, the inverter 34a of the enable signal generator 34 of the coefficient controller 204 inverts one bit value C1 counted by the flip-flop 4b and outputs the result to the NAND gate 34b, and the inverter 34c inverts the low level or high level coefficient selection signal N/CS in accordance with the horizontal compressing and extending mode and outputs the result to the NAND gate 34d.

The NAND gate 34b generates the reading enable signal RE1 by NANDing the coefficient selection signal N/CS of a high level or low level, the value inverted by the inverter 34 and one bit value C0 of the flip-flop 4a in accordance with a horizontal compressing and extending mode, and the NAND gate 34d generates the writing enable signal WE2 by NANDing the coefficient selection signal N/CS inverted into a high level or low level by the inverter 34c, and the bit values C0–C1 counted by the flip-flops 4a and 4b.

Here, the NAND gate 34d disables the line memory unit 207 using the low level of the writing enable signal WE2 when the bit values C0 and C1 outputted from the flip-flops 4a and 4b are "1,1" at the fourth range at every sample block counted by the counter 4 in the horizonal compressing mode. Here, in the 4:3 interpolation, the sample block is referred to a fourth sample range, and in the 7:8 interpolation, it is referred to a seventh sample range, namely, it is referred to the eighth sample range.

Figure 7:
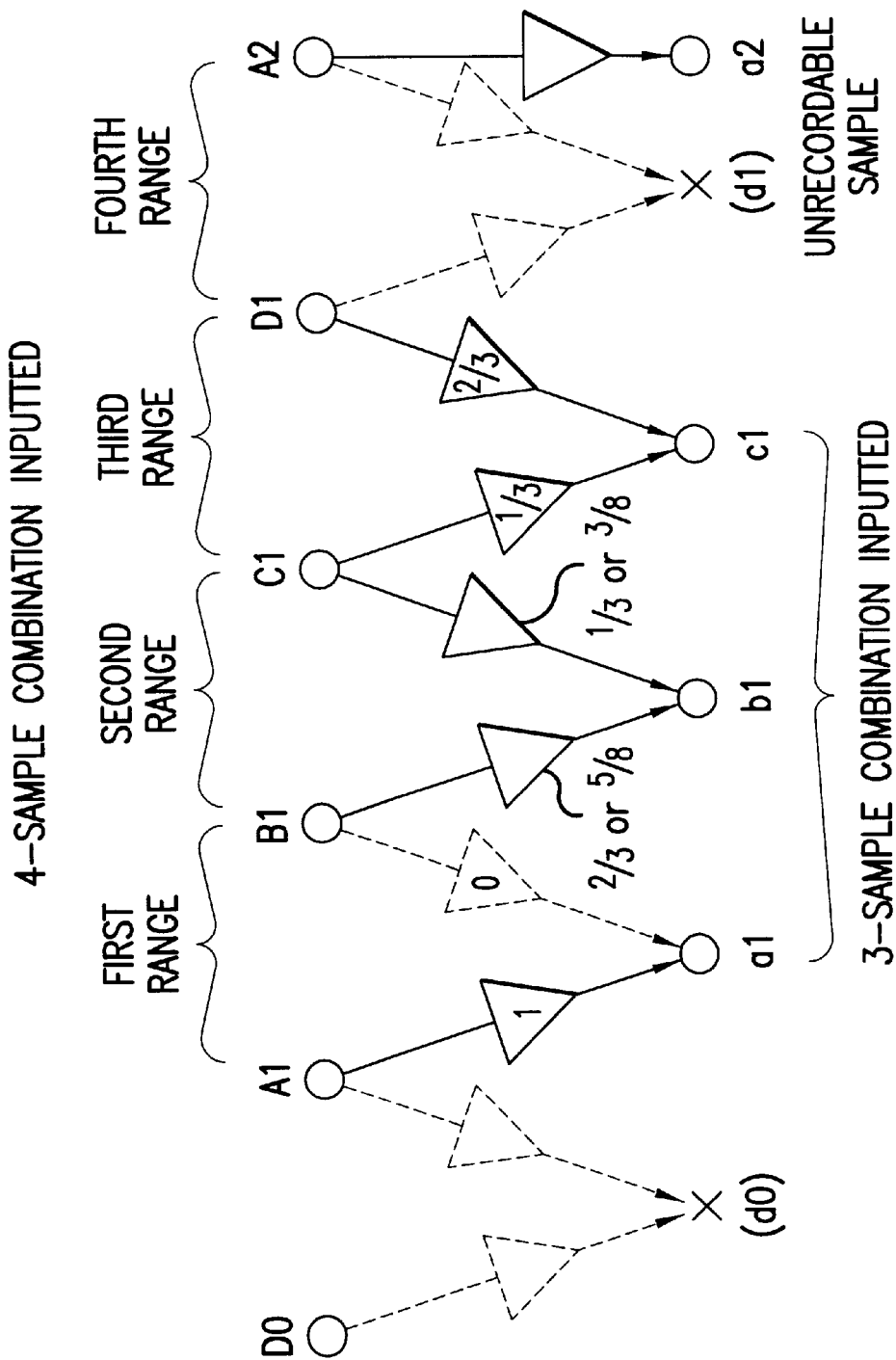
FIG. 7 is a view showing an example of a 4:3 sample interpolation process according to the operation of FIG. 3.

As shown in FIG. 7, it is unnecessary to write the data at fourth ranges D1 and A2 of each sample block in the first ranges A1 and B1, the second ranges B1 and C1, the third ranges C1 and D1, and fourth ranges D1 and A2.

In addition, except in the fourth range and eighth range, the writing enable signal WE2 becomes a high level and is outputted to the line memory unit 207, and in the horizontal extending mode, the high level is outputted at every sample range.

In the horizontal extending mode (in the cinema zoom mode), since the coefficient selection signal N/CS has a logically high level, when the second range, namely, the bit values C0 and C1 of the flip-flops 4a and 4b are referred to C0=1, C1=0 at every sample block by the NAND gate 34b, the reading enable signal RE1 becomes a low level, and the line memory unit 205 is disabled.

Figure 8:
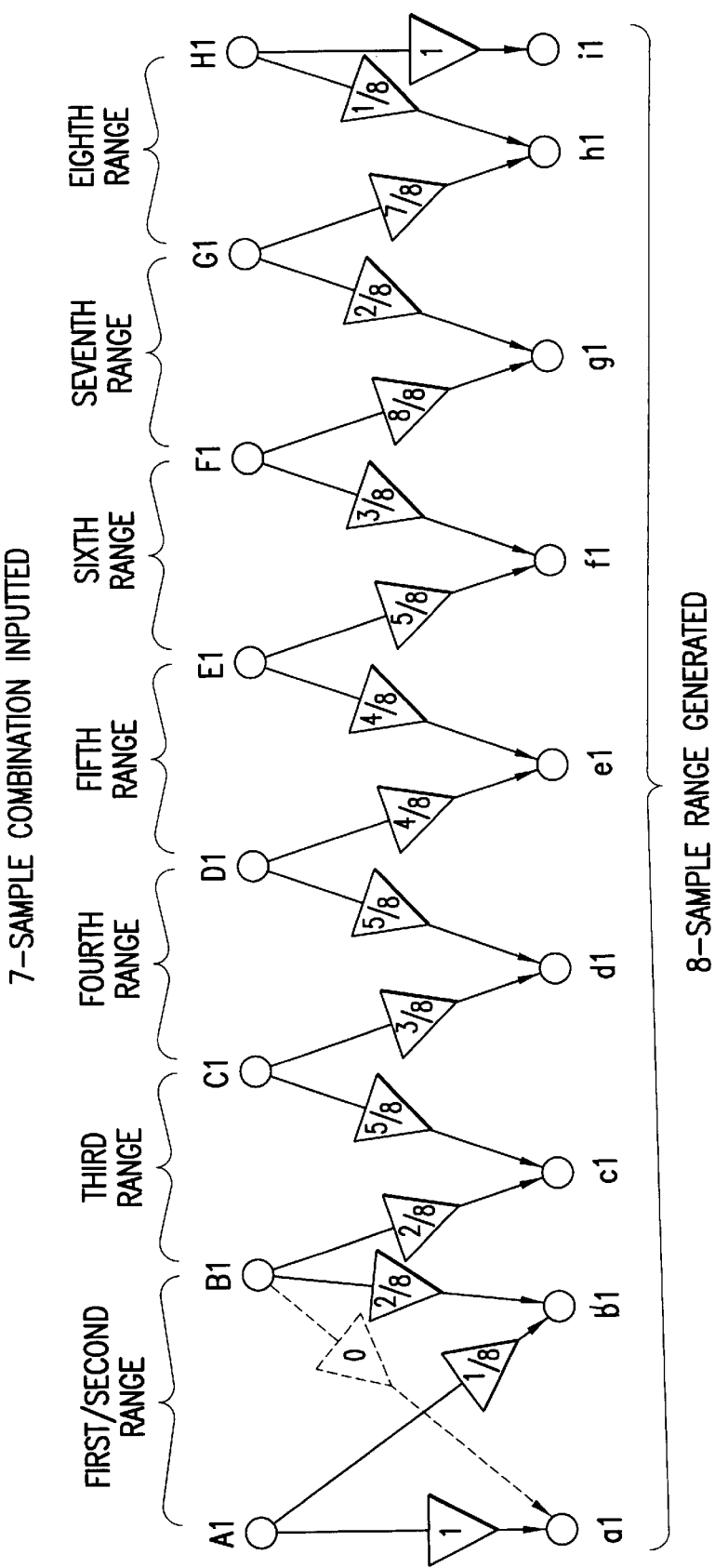
FIG. 8 is a view showing an example of a 7:8 sample interpolation process according to the operation of FIG. 3.

Namely, as shown in FIG. 8, it is unnecessary to read the data in the second ranges A1 and B1 among the first and second ranges A1 and B1, the third range B1 and C1, the fourth ranges C1 and D1, the fifth ranges D1 and E1, the sixth ranges E1 and F1, the seventh ranges F1 and G1, and the eighth ranges G1 and H1, and the current data is maintained, and the second sample b1 is created.

In addition, in the remaining sample ranges, the reading enable signal RE1 is outputted to the line memory unit 205 as a high level, and in the horizontal compressing mode, the reading enable signal RE1 is outputted as a high level signal at every sample range.

At this time, when the digital image data is inputted through the image input terminal 200, the line memory unit 205 is initialized by the edge detector 209 generating the reset signal RST whenever the rising edge of the horizonal synchronous signal Hsy is detected, and is controlled in accordance with the writing enable signal WE1 generated by the clock counter 203 and the reading enable signal RE1 generated by the coefficient controller 204. The line memory unit 205 receives the clock signal CLK1 generated by the clock generator 202 as the writing and reading clock signals WR and RD, and writes the input digital image data to the sample interpolation unit 206 in accordance with a horizontal image compressing and extending operation.

Figure 1:
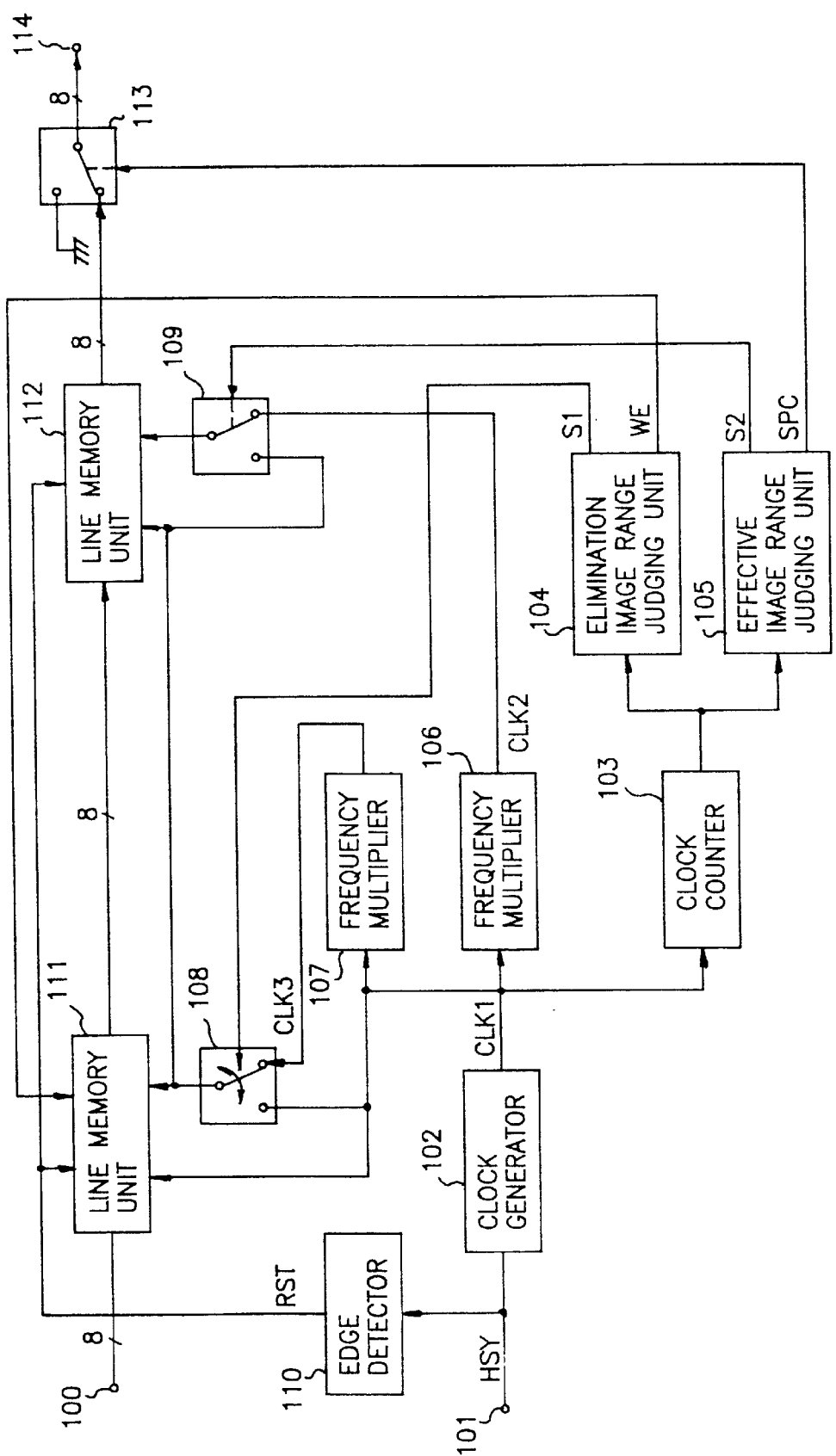
FIG. 1 is a block diagram showing a conventional apparatus for converting a screen aspect ratio.
Figure 2A:
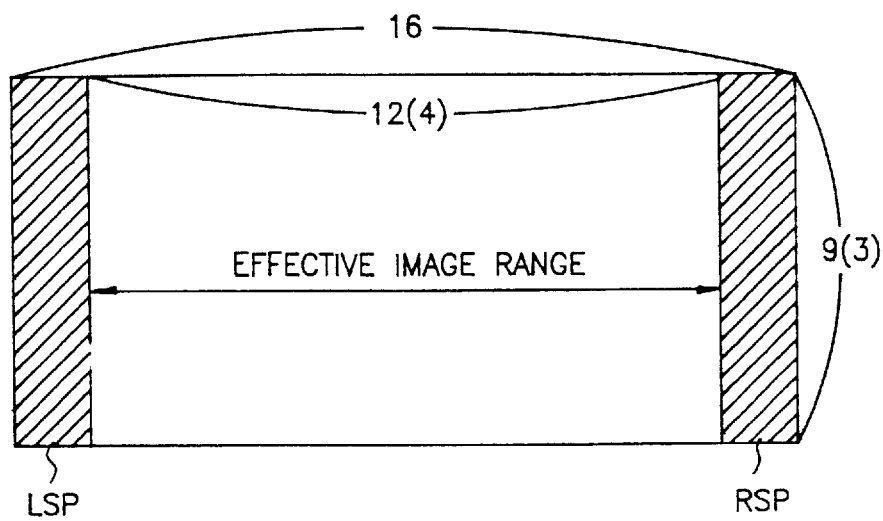
FIGS. 2A and 2B are views showing a screen conversion of a television of FIG. 1.
Figure 2B:
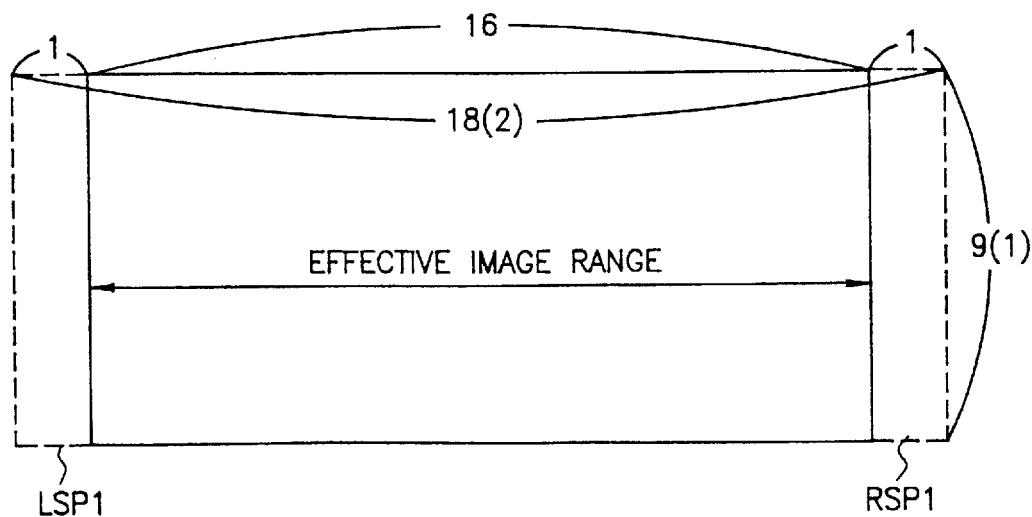

In addition, in the side panels LSP1 and RSP1 which are eliminated at the left-side and right-side in the cinema signal as shown in FIG. 2B, the line memory unit 205 is disabled in accordance with the writing enable signal WE1 generated by the clock counter 203, so that the image data is not written.

When reading the image data from the line memory unit 205 in the 4:3 horizontal compressing, the reading is performed in accordance with the reading enable signal RE1 generated at sample range from the NAND gate 34*b* of the enable signal generator 34 of the coefficient controller 204 and is outputted to the sample interpolation unit 206. The reading is performed in accordance with the reading enable signal RE1 which is generated at every sample range excluding the second sample range from the NAND gate 34*b* of the enable signal generator 34 when performing the horizontal extension (expansion) operation.

The sample interpolation unit 206 performs the sample interpolation into the 4:3 or 7:8 format in accordance with the coefficient control signals S0–S3 of four bits which are generated by the coefficient controller 204 using the current image data and previous image data which are inputted at every sample range from the line memory unit 205.

In other words, in case of the 4:3 interpolation, the four sample combinations (the sample block) of the image data outputted from the line memory unit 205 are created and outputted, and in case of the 7:8 interpolation, seven sample combinations (the sample block) outputted from the line memory unit 205 are created as eight sample combinations and are outputted to the line memory unit 207.

Namely, as shown in FIG. 5, the sample memory 6 of the sample interpolation unit 206 writes the image data outputted from the line memory unit 205 at every sample range, and outputs the written image data to the input terminal I0 of the selector 16*a* and the input terminal I1 of the selector 16*b* of the multiplexer 16, respectively, as the previous data.

The selector 16*a* selects either the previous image data stored in the sample memory 6 or the current image data which is directly inputted thereto not through the sample memory 6 in accordance with the coefficient control signal S0 of one bit selected by the selector 24*b* of the multiplexer 24 as shown in FIG. 4, and outputs the result to the input terminal I0 of the selector 36*a* of the multiplexer 36 and the multipliers 26*a*–26*d* of the line multiplier 26. The selector 16*b* selects either the current image data or the previous image data and outputs the result to the multipliers 26*e*–26*h* of the line multiplier 26.

At this time, in case of the 4:3 interpolation, as shown in FIG. 7, the input four samples are interpolated, and three samples a1, b1, and c1 are created.

The above-mentioned process will now be explained in more detail.

First, the coefficient control signal S0 of one bit outputted from the selector 24*b* of the coefficient controller 204, as shown in FIG. 4, selects and outputs either the flip-flop 4*a* or the flip-flop 4*c* of the counter 4.

Here, the selector 24*b*, as shown in FIG. 6, selects one bit value C0 counted by the flip-flop 4*a* in accordance with the coefficient control signal S0 in the horizontal compressing mode.

However, since the coefficient control signal S0 becomes a low level "0" within the first sample range, the third sample range, the fifth sample range, and the seventh sample range, the selector 16*a* as shown in FIG. 5 selects the previous image data stored in the sample memory 6 and outputs it to the input terminal I0 of the selector 36*a* and the multipliers 26*a*–26*d* of the line multiplier 26. Within the remaining sample ranges, the current image data, which is directly inputted from the line memory unit 205 and not through the sample memory 6, is selected and is outputted thereto.

In addition, the selector 16*b* selects the current image data inputted from the line memory unit 205 when the coefficient control signal S0 has a low level and outputs the result to the multipliers 26*e*–26*h* of the line multiplier 26. When the coefficient control signal S0 has a high level, as shown in FIG. 6, the previous image data stored in the sample memory 6 is selected within the second, fourth, sixth, and eighth sample ranges, and is outputted to the multipliers 26*e*–26*h*.

The multipliers 26*a*–26*d* of the line multiplier 26 multiply the pixels of the previous or current image data selected by the selector 16*a* by 1/8, 2/8, 3/8, 4/8, respectively, and output the results to the input terminals I1–I4 of the selector 36*a*, and the pixels of the image data multiplied by 1/8, 2/8, 3/8 are outputted to the input terminals I5–I7 of the selector 36*b*, respectively.

In addition, the multipliers 26*e*–26*h* of the line multiplier 26 multiply the pixels of the current or previous image data selected by the selector 16*b* by 4/8, 5/8, 6/8, 7/8, respectively, and output the results to the input terminals I4–I1 of the selector 36*b*, and the pixels of the image data multiplied by 5/8, 6/8, 7/8 are outputted to the input terminals I5–I7 of the selector 36*a*, respectively.

The selectors 36*a* and 36*b* of the multiplexer 36 selects the image data outputted from the input terminal I0–I7 at each sample range in accordance with coefficient control signals S1–S3 of three bits outputted from the selector 24*a* as shown in FIG. 4 and outputs the selected image data to the data summing unit 46.

Namely, "000", "110", "101", "011" from the first sample range to the fourth sample range and "000", "110", "101", "011" from the fifth sample range to the eighth sample range of the coefficient control signals S1–S3 of three bits outputted from the selector 24*a*, as shown in FIG. 6, are repeatedly outputted to the selectors 36*a* and 36*b*.

Therefore, the selectors 36*a* and 36*b*, as shown in FIG. 7, select the previous image data "1" and the ground voltage "0" inputted from the input terminal I0 within the first sample range and outputs them to the data summing unit 46, and the data summing unit 46 adds the two input data and creates one sample a1.

In addition, within the second sample range, the input terminal is selected in accordance with the coefficient control signals S1–S3 of three bits, the pixels multiplied by 3/8 and 5/8 by the multipliers 26*c* and 26*f* are selected and are outputted to the data summing unit 46, and the data summing unit 46 adds two pixel values, as shown in FIG. 7, and creates one sample b1.

Within the third sample range, the input terminal I5 is selected in accordance with the coefficient control signals S1–S3 of three bits, the pixels multiplied by 5/8 and 3/8 are selected, and the data summing unit 46 adds two pixel values and creates one sample c1.

Within the fourth sample range, the input terminal I6 is selected in accordance with the coefficient control signals S1–S3 of three bits, the pixel values multiplied by 6/8 and 2/8 are selected, and the data summing unit 46 adds two pixel values. Here, the added values are meaningless because the values are not written in the line memory unit 207.

Therefore, the image data interpolated into the 4:3 format by the sample interpolation unit 206 is outputted to the line memory unit 207.

In addition, in case of the 7:8 interpolation, as shown in FIG. 8, the seven samples are interpolated, and eight samples a1, b1, c1, d1, e1, f1, g1, h1, i1 are created.

Namely, for the sample a1, the input terminal of the selector 36*a* and the input terminal I0 of the selector 36*b* are selected and the sample a1 is created by the data summing unit 46, and for the sample b1, the input terminal I1 of the selectors 36a and 36b are selected, the pixels multiplied by 1/8 and 7/8 are selected, and the data summing unit 46 adds the values.

In addition, for the sample c1, the input terminal I2 of the selectors 36a and 36b are selected, the pixels multiplied by 2/8 and 6/8 are selected, and the data summing unit 46 adds the values, and for the sample d1, the input terminal I3 of the selectors 36a and 36b are selected.

In the same manner as described above, the samples e1–i1 are selected, and the eight samples a1–i1 are created by the data summing unit 46, and are outputted to the line memory unit 207.

Here, the coefficient control signal S0 of one bit outputted to the selectors 16a and 16b of the multiplexer 16 causes the image data outputted from the sample memory 6 for the samples a1–d1 to be inputted to the selector 36a through the multipliers 26a–26d, and for the samples e1–i1, the coefficient control signal S0 thereof causes the image data to be inputted to the selector 36b through the multipliers 26e–26h, so that it is possible to share two selectors 36a –36b, thus simplifying the construction of the system.

Therefore, the coefficient control signal S0 of one bit is referred to the output of the flip-flop 4c of which the state of the same varies at a fourth clock pulse.

Meanwhile, the line memory unit 207 receives the clock signal CLK1 outputted from the clock generator 202 as a single writing/reading clock signal, and writes/outputs the image data generated by the sample interpolation unit 206.

At this time, when the output bit values C0 and C1 of the flip-flops 4a and 4b within the fourth range and the eighth range in the horizontal compressing mode are "11", since the writing enable signal WE2 outputted from the NAND gate 34d of the enable signal generator 34 becomes a low level, the line memory unit 207 does not write the image data of the fourth range and eighth range inputted from the sample interpolation unit 206. Namely, the line memory unit 207 is enabled there within and writes the image data of the sample interpolation unit 206.

As shown in FIG. 7, it is unnecessary to write the data within the fourth range and the eighth range.

In addition, in case of the horizontal extending, since the writing enable signal WE2 outputted from the NAND gate 34d is inputted in a high level at every sample range, the line memory unit 207 writes the image data outputted from the sample interpolation unit 206 at every line.

Since the reading enable signal RE2 outputted to the line memory unit 207 is connected to the power terminal VCC, the stored data is outputted through the output terminal 210 at every line, so it is possible to obtain the image data which is horizontally converted to the 4:3 or 7:8.

Figure 9:
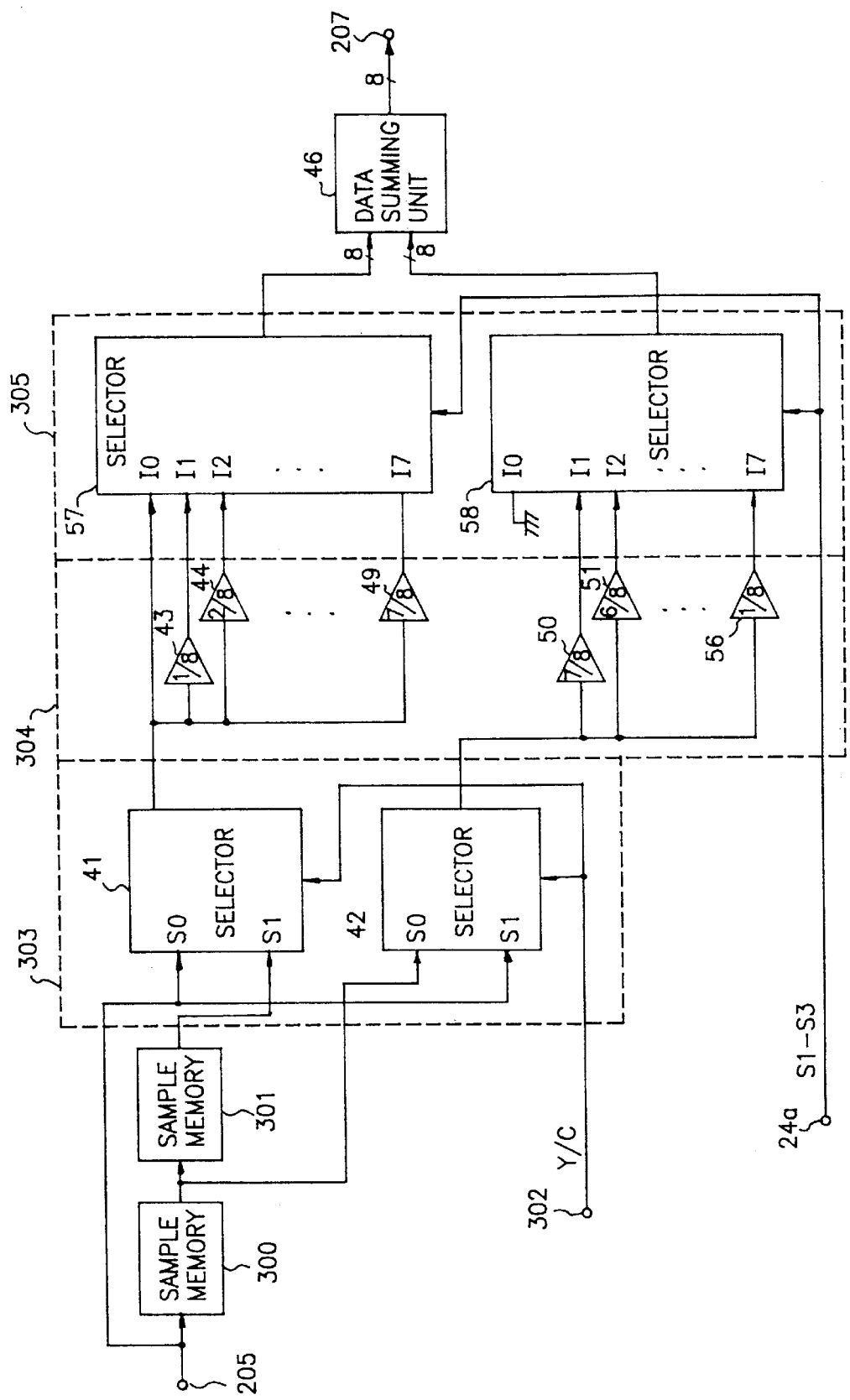
FIG. 9 is a block diagram showing a sample interpolation unit of FIG. 3 according to another embodiment of the present invention.

In addition, FIG. 9 shows the construction of the sample interpolation unit according to another embodiment of the present invention. As shown herein, the coefficient control signal S0 of one bit outputted from the selector 24b of FIG. 4 is unnecessary. A plurality of multipliers are connected between the current image data and the sample-delayed image data.

As shown in FIG. 3, there are provided sample memories 300 and 301 for receiving the image data of the line memory 205 and for delaying the output of the image data by one sample or two samples, a multiplexer 303 for being switched in accordance with a luminance signal Y and a chrominance signal C outputted from the externally connected input terminal 302, selecting the current image date outputted from the line memory unit 205 and the image data delayed by two samples by the sample memory 301 through the selector 41 or for selecting the current image data outputted from the line memory unit 205 and the image data delayed by one sample by the sample memory 300 through the selector 42, a line multiplier 304 for multiplying the image data selected by the multiplexer 303 and delayed by one sample and the current image data or the image data delayed by two samples and the current image data with differently set coefficient values, and a multiplexer 305 for multiplexing image data interpolated by the line multiplier 304 and the image data and ground voltage outputted from the selector image data read from the line memory 205 are outputted to the selector 42 of the multiplexer 303.

At this time, when the luminance signal Y of one bit is inputted from the externally connected input terminal 302, the selector 41 of the multiplexer 303 selects the current image data inputted through the input terminal S0 and outputs the selected image data to the multipliers 43–49 of the line multiplier 304 and to the input terminal I0 of the selector 57 of the multiplexer 305, and the selector 42 selects the image data delayed by one sample by the sample memory and outputs to the multipliers 50–56.

Therefore, the multipliers 43–49 multiply the current image data selected by and outputted from the selector 41 by coefficient values of 1/8, 2/8, 3/8, 4/8, 5/8, 6/8 and 7/8, respectively, and output the results to the input terminals I1–I7 of the selector 57, and the multipliers 50–56 multiply the image data delayed by one sample outputted from the selector 42 by coefficient values of 7/8, 6/8, 5/8, 4/8, 3/8, 2/8 and 1/8, respectively, and output the results to the input terminals I1–I7 of the selector 58.

The selector 57 selects the current image data selected by the selector 41 and the image data multiplied by the multipliers 43–49 at the sample range in accordance with the coefficient control signals S1–S3 of three bits outputted from the selector 24a as shown in FIG. 4 and outputs the results to the data summing unit 46, and the selector 58 selects the ground voltage "0" and the image data multiplied by the multipliers 50–56 at the sample range in accordance with the coefficient control signals S1–S3 of three bits outputted from the selector 24a and outputs the results to the data summing unit 46.

In addition, when the chrominance signal C is inputted through the externally connected input terminal 302, the selector 41 of the multiplexer 303 selects the image data delayed by two samples by the sample memory 301 and outputs the selected image data to the input terminal I0 of the selector 57, and the selector 42 selects the current image data outputted from the line memory unit 205 and outputs the selected image data to the multipliers 50–56.

Therefore, as described above, the multipliers 43–49 multiply the image data delayed by two samples by different coefficient values and output the results to the selector 57, and the multipliers 50–56 multiply the current image data by different coefficient values and output the results to the selector 58.

Thereafter, the selectors 57 and 58 select the current image data and the image data delayed by two samples which are interpolated by the multipliers at the sample range in accordance with the coefficient control signals S1–S3 of three bits outputted from the selector 24a of the multiplexer 24, and outputs the results to the data summing unit 46.

Therefore, the data summing unit 46 adds the interpolated current image data and the image data delayed by one sample, or adds the current image data and the image data delayed by two samples, and the added imaged data are outputted through the output terminal 210 as the image data interpolated to the 4:3 or 7:8 format through the line memory unit 207 as shown in FIG. 3.

Figure 10:
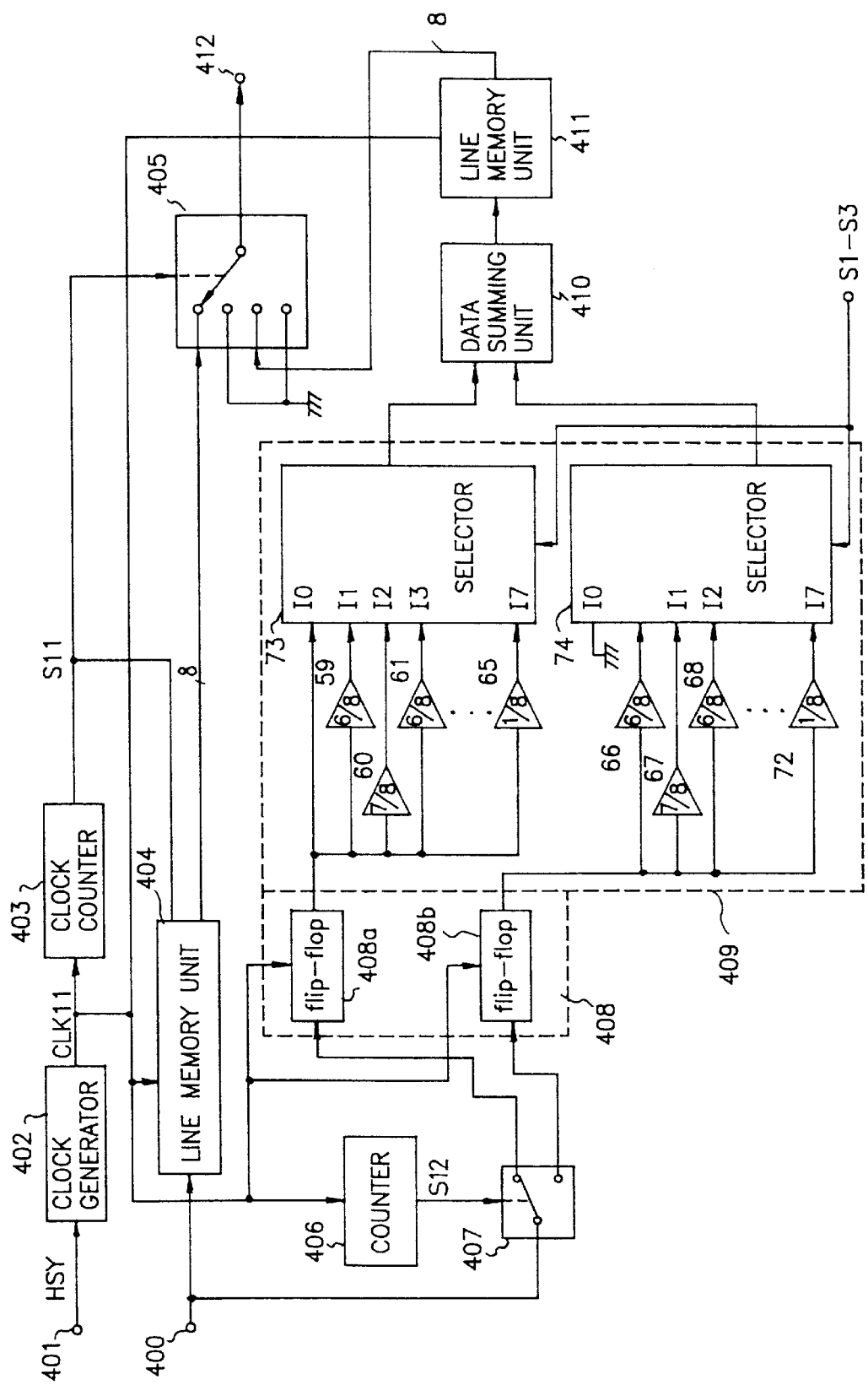
FIG. 10 is a block diagram showing an apparatus for converting a screen aspect ratio according to a second embodiment of the present invention.

FIG. 10 shows the apparatus for converting a screen aspect ratio according to another embodiment of the present invention, which includes a clock counter 403 for counting the clock signal CLK11 generated by a clock generator 402 within a set range whenever a horizontal synchronous signal Hsy is inputted through a synchronous input terminal 401, a line memory unit 404 for receiving the selection signal S11 generated by the clock counter 403 as a writing enable signal W2 and for FIFOing the digital image data inputted through the imaged input terminal 400 in response to the clock signal CLK11 of the clock generator 402, a counter 406, which is referred to a T flip-flop, for receiving the clock signal CLK11 from the clock generator 402 and for generating the selection signal S12 of one bit at every clock pulse, a switch 407 for alternately switching the digital image data inputted through the image input terminal 400 in accordance with the selection signal S12 of the counter 406, a data storing unit 408 for alternately storing the image data inputted from the switch 407 in the flip-flops 408b in response to the clock signal CLK11 generated by the clock generator 402, a sample interpolation unit 409 for interpolating the image data outputted from the data storing unit 408 using different set of coefficient values and for switching at every sample range in accordance with the coefficient control signals S1–S3 of three bits externally inputted thereto, a data summing unit 410 for summing the image data interpolated by the sample interpolation unit 409, a line memory unit 411 for FIFOing the image data summed by the data summing unit 410 in response to the clock signal CLK11 generated by the clock generator 402, and a switch 405 for sequentially selecting the image data of eight bits and the set ground voltage with respect to two lines outputted from the line memories 404 and 411 in accordance with the selection signal S11 outputted from the clock counter 403 and for outputting the selection results to the output terminal 412.

The sample interpolation unit 409 includes multipliers 59–65 for multiplying the image data outputted from the flip-flop 408a of the data storing unit 408 by coefficient values 7/8, 6/8, 5/8, 4/8, 3/8, 2/8, 1/8, respectively, multipliers 66–72 for multiplying the image data outputted from the flip-flop 408b of the storing unit 408 by coefficient values 7/8, 6/8, 5/8, 4/8, 3/8, 2/8, 1/8, respectively, a selector 73 for sequentially selecting at every sample the image data of seven bits obtained by the multipliers 59–65 and the image data of one bit outputted from the flip-flop 408a in accordance with the externally inputted coefficient control signals S1–S3 of three bits, and a selector 74 for sequentially selecting at every sample the image data of seven bits obtained by the multipliers 66–72 and the ground voltage of one bit in accordance with the externally inputted coefficient control signals S1–S3 of three bits.

The operation of the screen aspect ration conversion device according to another embodiment of the present invention will now by explained with reference to the accompanying drawings.

First, when the horizontal synchronous signal Hsy is inputted through the synchronous input terminal 401, the clock generator 402 generates the clock signal CLK11 whenever the horizontal synchronous signal Hsy is inputted and outputs the clock signal CLK11 to the clock counter 403, the line memories 404 and 411, the counter 406 and the flip-flops 408a and 408b of the data storing unit 408, respectively.

The clock counter 403 counts the clock signal CLK11 inputted from the clock generator 402 within the set range, separates the horizontal scanning line range, the side panel range, and the effective image range in the compressing mode, and outputs the selection signal S11 to the line memory unit 404 and the switch 405. In the extending mode, the clock counter 403 separates the horizontal scanning range, the image elimination range, and the effective image range, and outputs the selection signal S11 to the line memory unit 404 and the switch 405.

In addition, the counter 406 changes the selection signal S12 to a high level and a low level whenever the clock signal CLK11 is outputted from the clock generator 402 and outputs the signal S12 to the switch 407.

At this time, when the digital image data is inputted through the image input terminal 400, the line memory unit 404 receives the selection signal S11 generated by the clock counter 403 as the writing enable signal WE and outputs the input digital image data, which is not interpolated, to the switch 405 in response to the clock signal CLK11 of the clock generator 402.

In addition, the switch 407 is switched at every line in accordance with the selection signal S12 outputted from the counter 406, and alternately inputs the image data inputted through the image input terminal 400 in the flip-flops 408a and 408b (e.g., D flip-flops) of the data storing unit 408.

The flip-flops 408a and 408b of the data storing unit 408 store the image data alternately inputted to the switch 407 in response to the clock signal CLK11 of the clock generator 402.

Namely, since the image data in the real image range is compressed by 3/4, the image data is alternately written in the flip-flops 408a and 408b at every sample within the image data range.

The sample of the image data written on the flip-flops 408a and 408b of the data storing unit 408 is alternately outputted to the sample interpolation unit 409.

The sample interpolation unit 409 multiplies the sample (the pixel) of the image data which are alternately inputted from the flip-flops 408b of the data storing unit 408 by different coefficient values and combine the sample of each image data at every line.

Namely, the image data delayed by one sample by the flip-flop 408a of the data storing unit 408 is multiplied by coefficient values of 1/8, 2/8, 3/8, 4/8, 5/8, 6/8, 7/8 by the multipliers 59–65 and is outputted to the input terminals I0–I7 of the selector 73, and the image data delayed by one sample by the flip-flop 408b is multiplied by coefficient values 7/8, 6/8, 5/8, 4/8, 3/8, 2/8, 1/8 and is outputted to the input terminals I0–I7 of the selector 74.

The selector 73 selects at every line the image data delayed by one sample by the flip-flop 408a and the image data obtained by the multipliers 59–65 in accordance with externally inputted coefficient control signals S1–S3 of three bits, and the selector 74 selects the image data obtained by the multipliers 66–72 and the ground voltage at every line and outputs the results to the data summing unit 410.

Therefore, the data summing unit 410 adds the image data of eight bits which are selected and inputted at every line from the selectors 73 and 74 and outputs the addition results to the line memory unit 411.

The line memory unit 411 FIFOs the image data interpolated and outputted from the data summing unit 410 in accordance with the clock signal CLK11 of the clock generator 402 and outputs the results to the switch 405.

At this time, as described above, in the compressing mode, the switch 405 selects the image data of the line memory unit 404, the ground voltage, the image data of the line memory unit 411, and the ground voltage in order, in accordance with the horizontal scanning line range and the selection signal S11 of the clock counter 403 based on the separation of the effective image range, and outputs the selection results through the output terminal 412. In the extending mode, the image data ranges of the line memory units 404 and 411 are sequentially selected, and then the horizontally converted image data is outputted through the output terminal 412.

Figure 11:
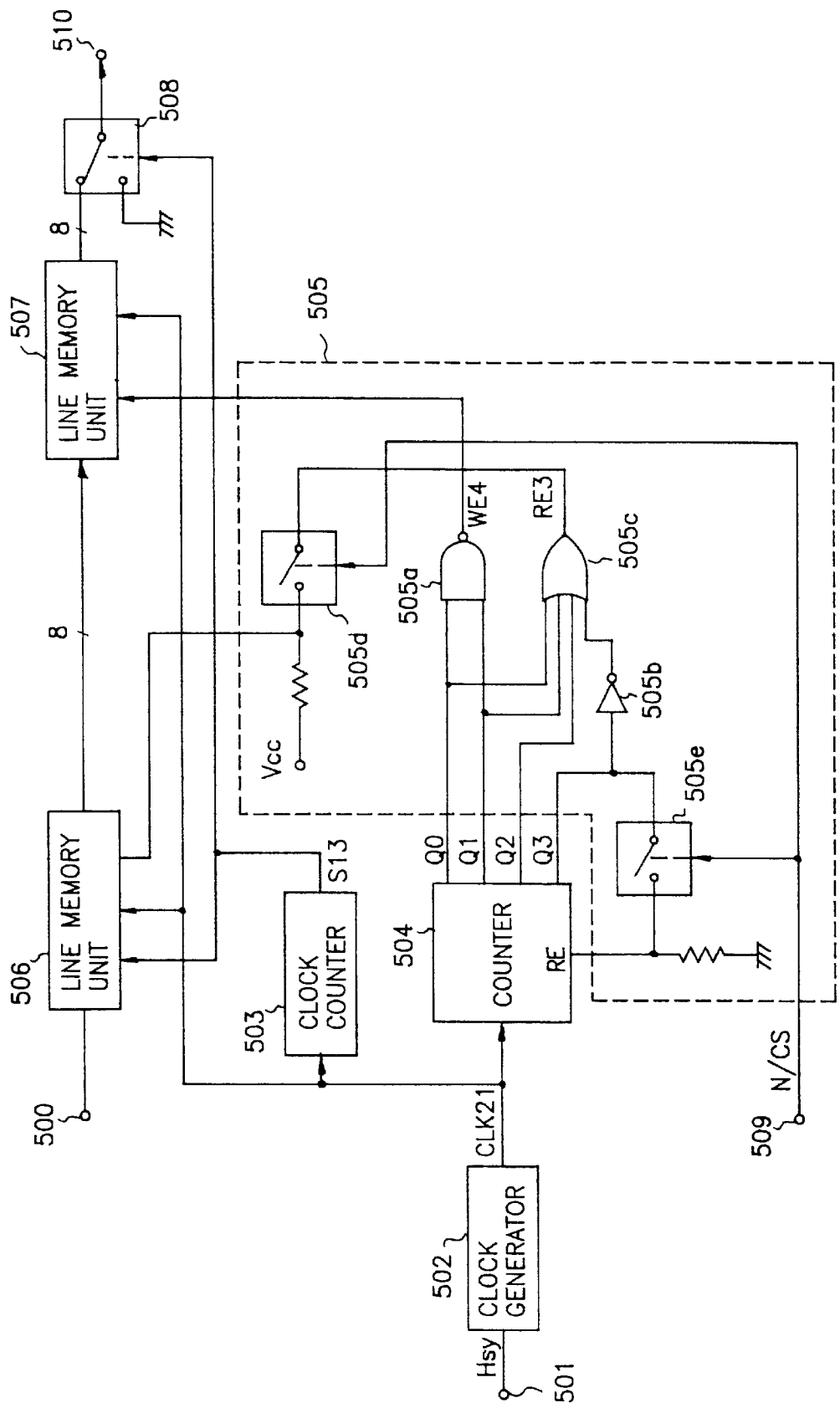
FIG. 11 is a block diagram showing an apparatus for converting a screen aspect ratio according to a third embodiment of the present invention.

FIG. 11 shows an apparatus for converting a screen aspect ratio according to another embodiment of the present invention, which includes a clock generator 502 for generating a clock signal CLK21 whenever the horizontal synchronous signal Hsy is inputted from a synchronous input terminal 501, a clock counter 503 for counting the clock signal CLK21 generated by the clock generator 502 within the set range and for generating a selection signal S13 of one bit, a counter 504 for counting the clock signal CLK21 generated by the clock generator 502 and for outputting four bit values, a logic controller 505 for logically processing the four bit values counted by the counter 504, creating a reading enable signal RE3 and a writing enable signal WE4, generating a reset signal REST in accordance with the coefficient selection signal N/CS inputted from the external control terminal 509 and resetting the counter 504, a line memory unit 506 for receiving a selection S13 of one bit generated by the clock counter 503 as a writing enable signal, receiving the reading enable signal RE3 generated by the logic input terminal 500, and storing the image data inputted through the image input terminal in response to the clock signal CLK21 of the clock generator 502, a line memory unit 507 for storing the image data which is sequentially inputted from the line memory unit 506 in accordance with the writing enable signal WE4 generated by the logic controller 505, and a switch 508 for being switched in accordance with the selection signal S13 generated by the clock counter 503, selecting the image data or the ground voltage of the line memory unit 507, and outputting the interpolated digital image data through an output terminal 510.

The logic controller 505 includes a NAND gate 505a for ANDing and inverting the output signals Q0 of the counter 504, an inverter 505b for inverting the output signal Q3 of the counter 504, an OR gate 505c for logically processing the output signals Q0–Q2 of the counter 504 and the output signal of the inverter 505b and for generating a reading enable signal RE3, a switch 505d for switching the reading enable signal RE3 of the OR gate 505c from the line memory unit 506 in accordance with the coefficient selection signal N/CS outputted from the externally connected control terminal 509, and a switch 505e for switching the output signal Q3 of the counter 504 from the reset terminal RE of the counter 504 in accordance with the coefficient selection signal N/CS inputted through the externally connected control terminal 509.

The operation of the apparatus for converting the screen aspect ratio according to another embodiment of the present invention will be explained with reference to the accompanying drawings.

To begin with, in the compressing mode, the counter 504 outputs coefficients 0–3 as the output signals Q0–Q1, and in the extending mode, the counter 504 outputs coefficients 0–8 as the output signals Q0–Q3.

Here, when the output signal Q3 of the counter 504 has a high level, it is reset by the switch 505e, and becomes the module-9 counter.

In addition, in the compressing mode, since the reset terminal RE of the counter 504 has a low level, it is unnecessary to reset the counter 504.

In addition, in the compressing mode, when the output signals Q0 and Q1 of the counter 504 is "11", namely, the writing enable signal WE4 becomes a low level and a 4:3 decimation is performed through the NAND gate 505a of the logic controller 505 in order to prevent the writing of the input data in the line memory unit 507 in the fourth range.

Meanwhile, in the extending mode, when the output signals Q3–Q0 of the counter 504 is "1000", the image data inputted through the image input terminal 500 in the ninth range is not read by the line memory unit 506, and the low-level reading enable signal RE3 generated by the OR gate. 505c is applied to the line memory unit 506 so that the previous data is directly transferred to the line memory unit 507. Thus, the last sample at the eighth sample is duplicated, and the 8:9 duplication is performed.

Here, the reason that the 8:9 duplication instead of the 7:8 interpolation is performed is to more correctly display the 2:1 cinema signal on the screen of 16:9. It is not related to the characteristic of the hardware.

The roles of the selection signal S13 and the switch 508 outputted from the clock counter 503 are the same as those shown in FIG. 10, the operation thereof will be omitted.

In the compressing mode, the sample is decimated, and in the extending mode, the sample is duplicated, so that the horizontal compressing and extending are performed.

In addition, when the line memory is adapted instead of the sample memory, and the field memory is adapted instead of the line memory, the image signal can be vertically compressed and extended.

As explained above, the apparatus for converting the screen aspect ratio according to the present invention is directed to horizontally compressing and extending two image signals by writing in and reading from two line memories in accordance with a single lock signal when a 4:3 image signal is received in the 16:9 wide screen television or a 2:1 cinema image signal is received therein, thus simplifying the construction of the system, compressing and extending the image in various ratios, and enabling a more stable operation of the system.

In addition, when the line memory is adapted instead of the sample memory, and the field memory is adapted instead of the line memory, it is possible to vertically compress and extend the image, thus varying the screen aspect ratio of the image signal using a single clock signal.

Figure 12:
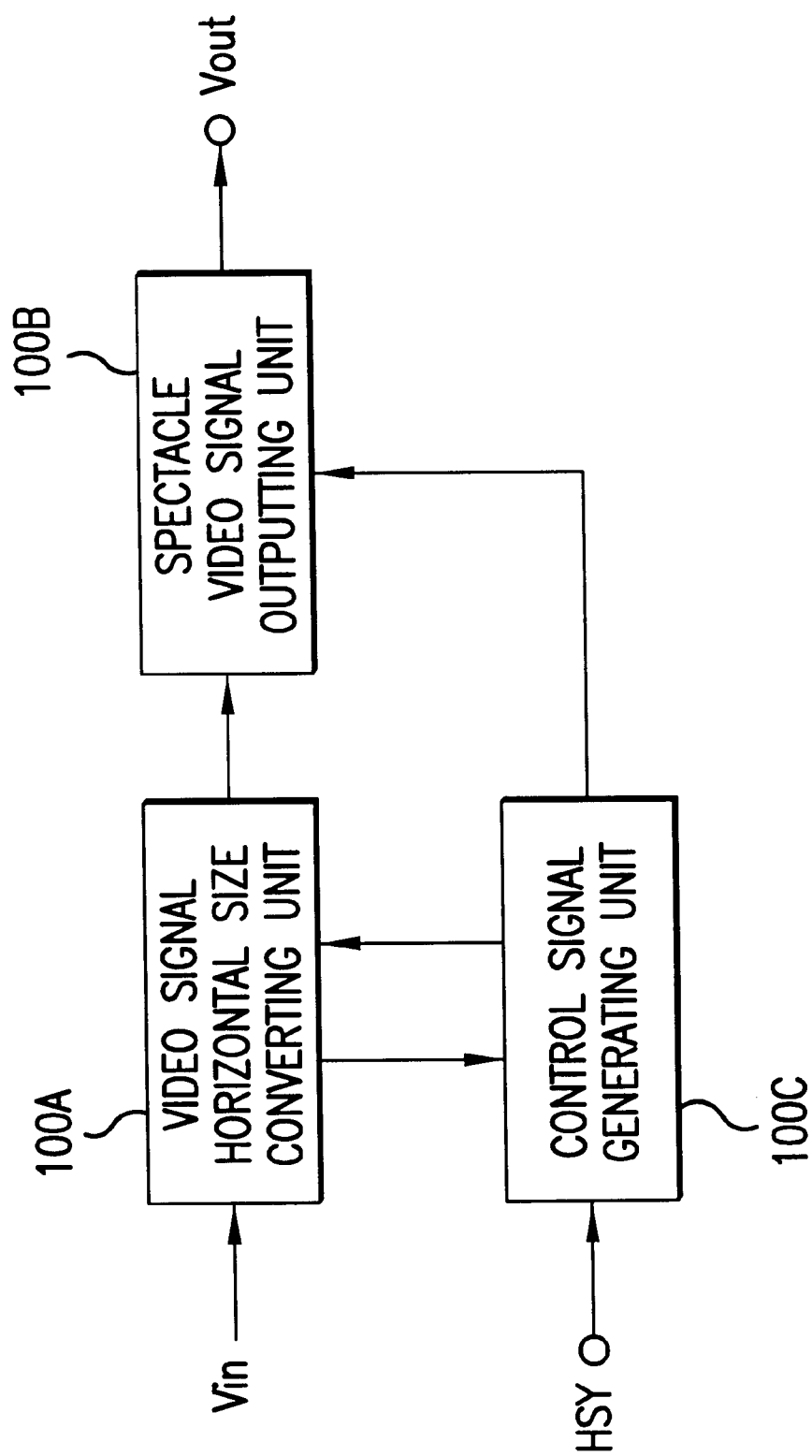
FIG. 12 is a schematic diagram showing an apparatus for converting a screen aspect ratio according to another embodiment of the present invention.

FIG. 12 is a schematic diagram showing an apparatus for converting a screen aspect ratio according to another embodiment of the present invention, which includes a video signal horizontal size converting unit 100A for receiving an input video signal and outputting an output signal for a wide screen mode by adjusting a line memory and expanding or compressing the input video signal at a predetermined ratio based on a horizontal size of a screen, a spectacle video signal outputting unit 100B for selecting a predetermined video signal from the output video signals outputted from the video signal horizontal size converting unit 100A, controlling a read/write operation of the line memory based on a changing degree of a horizontal size of the selected video signal and generating a digital output video signal in which the number of horizontal pixels is changed by a screen section, and a control signal generating unit 100C for generating a read enable signal enabling the field memory based on a horizontal synchronous signal $H_{sy}$ and for generating selection signals according to a wide screen section, an expanded screen section and a compressed screen section and outputting these signals to the video signal horizontal size converting unit 100A and the spectacle video signal outputting unit 100B.

Figure 14A:
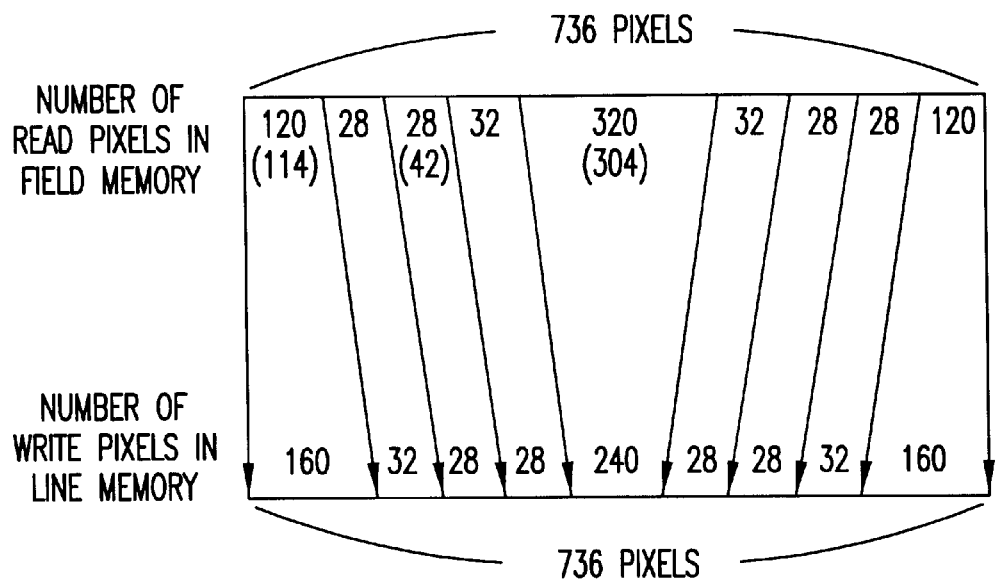
FIG. 14A is a diagram showing a spectacle screen having various kinds of widths according to the present invention.
Figure 14B:
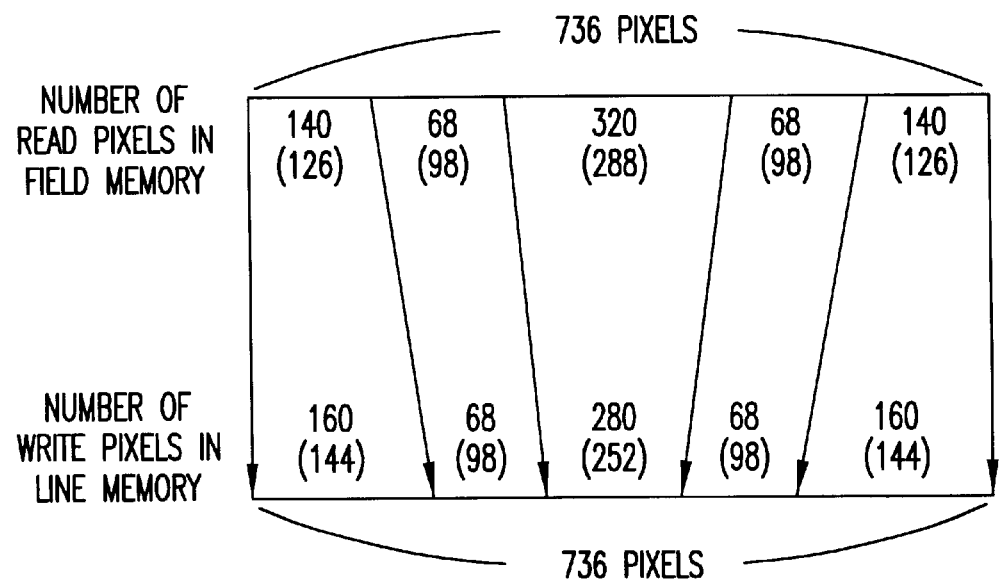
FIG. 14B is a diagram showing a spectacle screen having simple kinds of widths according to the present invention.
Figure 14C:
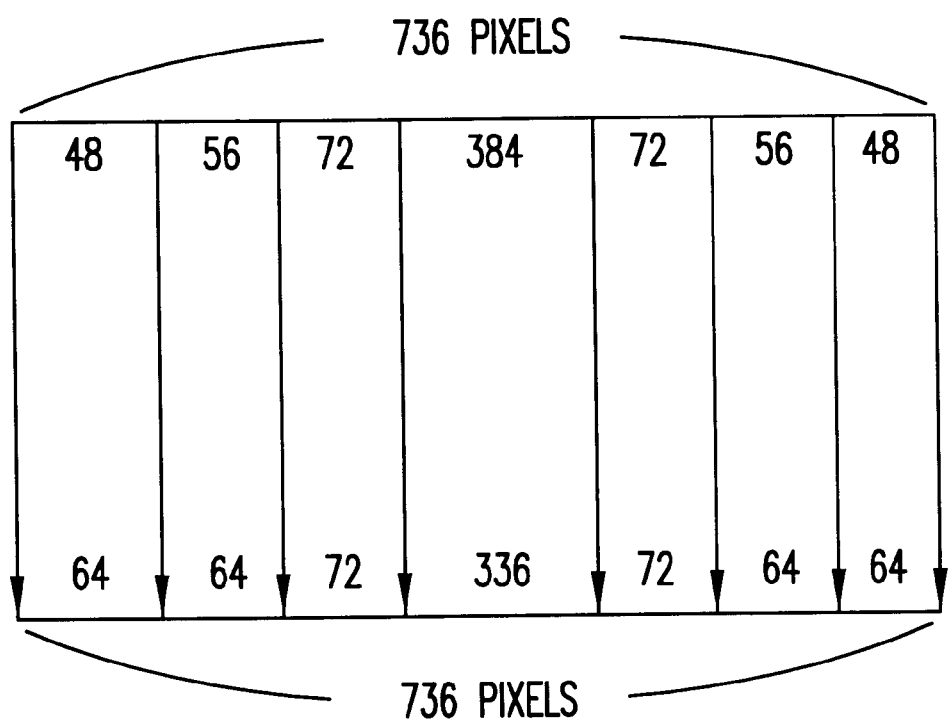
FIG. 14C is a diagram showing a spectacle screen with a wide part in the middle according to the present invention.

FIGS. 14A through 14C illustrate the construction of a spectacle screen according to the present invention. As shown therein, the number of horizontal pixels is changed by the screen section for forming a spectacle screen based on reasons that an expansion in the horizontal direction is prevented from being affected by decreasing the number of pixels of the center portion of the screen on which a more important image is displayed when expanding the screen in the horizontal direction compared to the original image based on the aspect ratio conversion of the screen, and on the contrary, the number of pixels is maintained identically by increasing the number of the pixels of a lateral portion on which a less important image is displayed compared to the center portion of the screen.

The operation of the present invention which is directed to forming a spectacle screen as shown in FIG. 14A through 14C will be explained with reference to FIG. 13.

A digital input video signal $V_{in}$ is directly inputted to a switch 109 through a field memory 101 and a switch 103, respectively, for implementing the wide screen mode. In addition, the unnecessary section is eliminated by a vertical video signal deleting unit 102 in the vertical zoom mode. In the spectacle mode, since the video signal is not expanded in the vertical direction, the video signal outputted from the field memory 101 is selected and used as an input signal of a horizontal processing apparatus.

As the horizontal processing apparatus, a horizontal 4/3 expanding apparatus 104, a horizontal 8/7 expanding apparatus 105, and a horizontal 7/8 compressing apparatus 106 are used. In particular, since the outputted data size gradually increases compared to the data which are inputted based on an interpolation by the horizontal 4/3 expanding apparatus 104 and the horizontal 8/7 expanding apparatus 105, the read enable signal is disabled in which the data are read as much as the increased data.

At this time, a read enable signal RE of the field memory 101 is disabled whenever an interpolation data is generated in a corresponding horizontal expanding section based on four kinds and seven sections as shown in FIG. 14C as a section kind processed every line.

For implementing the above function, the clock signal generator 114 generates a clock signal CK in synchronization with a horizontal synchronous signal $H_{sync}$, and the read enable signal generator 115 supplies a read enable signal RE to the field memory 101 based on the generated clock signal CK and disables the read enable signal RE whenever a read disable signal RE-DIS is inputted through the OR-gate 107, so that the time required for reading a data as many as one line is extended.

Since the time required for the data delayed by the line memory 110 is determined based on the extended time for reading the data of one line compared to the time required for a normal operation, the read reset signal RE-RST of the line memory 110 is delayed as much as the time required for the delayed data using the counter 112.

In addition, when compressing the video signal in the horizontal direction, since the number of the data which are outputted is decreased rather than the number of the data inputted based on a decimation of the horizontal 7/8 compressing apparatus 106, it is needed to disable the data write enable signal of the line memory 110 as much as the time corresponding to he number of the data which are decreased.

At this time, whenever the decimation data is generated in the horizontal compressing section, the write enable signal of the line memory 110 is disabled. The above operation is performed similarly with the operation in which the read enable signal RE of the field memory 101 is disabled. Therefore, in this case, the read and write operation of the line memory 110 is performed, and the write disable signal WE-DIS is outputted to the counter 112 through the OR-gate 108, based on which the counter 112 delays the read reset signal RE-RST of the line memory 110.

The video signal outputted from the line memory 110 is outputted as a digital output video signal $V_{out}$ through the vertical processing unit 111 for thereby forming a spectacle screen as shown in FIGS. 14A through 14C.

At this time, the clock signal counter 116 counts the wide screen section, the 4/3 expanded screen section, the 8/7 expanded screen section, and the 7/8 compressed screen section and outputs section signals WPS, 4/3EPS, 8/EPS and 78DPS. The binary encoder 117 outputs a selection signal SEL1 to the switch 103 based on the section signal, and a selection signal SEL2 of 2 bits to the switch 109, so that one signal is selected between the wide mode video signal directly inputted from the field memory 101 through the switch 109 and a video signal outputted from the horizontal 4/3 expanded screen apparatus 104, the horizontal 8/7 expanded apparatus 105, and the horizontal 7/8 compressed apparatus 106. And then, the selected signal is stored into the line memory 110.

FIGS. 14A through 14C illustrate the construction of a spectacle screen according to the present invention. As shown therein, the number of horizontal pixels is changed by the section for thereby forming a spectacle screen based on the reasons that an expansion in the horizontal direction is prevented from being affected by decreasing the number of pixels of the middle of the screen on which a more important image is displayed when expanding the screen in the horizontal direction compared to the original image based on the aspect ratio conversion of the screen, and on the contrary, the number of pixels is maintained identically by increasing the number of the pixels of a lateral portion on which a less important image is displayed compared to the center portion of the screen.

The operation of the present invention which is directed to forming a spectacle screen as shown in FIGS. 14A through 14C will be explained with reference to FIG. 13.

A digital input video signal $V_{in}$ is directly inputted into a switch through a field memory and a switch, respectively, for implementing the wide mode. In addition, the section which is not needed is eliminated by the vertical video deleting unit in the vertical zoom mode. In the spectacle mode, since the video signal is not expanded in the vertical direction, the video signal outputted from the field memory is selected and used as an input signal of a horizontal processing apparatus.

As the horizontal processing apparatus, a horizontal 4/3 expanding apparatus, a horizontal 8/7 expanding apparatus and a horizontal 7/8 compressing apparatus are used. In particularly, since the data which are outputted is gradually increased compared to the data which are inputted based on an interpolation by the horizontal 4/3 expanding apparatus 104 and the horizontal 8/7 expanding apparatus, the read enable signal is disabled, in which the data are read as much as the increased data.

At this time, a read enable signal RE of the field memory is disabled whenever an interpolation data is generated in a corresponding horizontal expanding section based on four kinds and seven sections as shown in FIG. 14C as a section kind processed every line.

For implementing the above function, the clock signal generator 202 generates a clock signal in synchronization with a horizontal synchronous signal $H_{sync}$, and the read enable signal generator supplies a read enable signal RE the field memory based on the generated clock signal and disables the read enable signal RE whenever a read disable signal RE-DIS is inputted through the OR-gate, so that the time required for reading a data as many as one line is extended.

Since the time required for the data delayed by the line memory is determined based on the extended time for reading the data of one line compared to the time required for a normal operation, the read reset signal RE-RST of the line memory is delayed as much as the time required for the delayed data using the counter.

In addition, when compressing the video signal in the horizontal direction, since the number of the data which are outputted is decreased rather than the number of the data inputted based on a decimation of the horizontal 7/8 compressing apparatus, it is necessary to disable the data write enable signal of the line memory as much as the time corresponding to the number of the data which are decreased.

At this time, whenever the decimation data is generated in the horizontal compressing section, the write enable signal of the line memory is disabled. The operation is performed similarly with the operation in which the read enable signal RE of the field memory 101 is disabled. Therefore, in this case, the read and read operation of the line memory is performed, and the write enable disable signal WE-DIS is outputted to the counter through the OR-gate, which counter delays the read reset signal RE-RST of the line memory.

The video signal outputted from the line memory is outputted as a digital output video signal $V_{out}$ through the vertical processing unit for thereby forming a spectacle screen as shown in FIG. 14A through 14C.

At this time, the clock signal counter counts the wide screen section, the 4/3 expanded screen section, the 8/7 expanded screen section, and the 7/8 compressed screen section and outputs section signals WPS, 4/3EPS, 8/7EPS and 7/8DPS. The binary encoder 117 outputs a selection signal SEL1 to the switch 103 based on the section signal and a selection signal SEL2 of 2 bits to the switch, so that one signal is selected between the wide mode video signal directly inputted from the field memory through the switch and a video signal outputted from the horizontal 4/3 expanded screen apparatus, the horizontal 8/7 expanded apparatus, and the horizontal 7/8 compressed apparatus. And then the selected signal is stored into the line memory.

Figure 15A:
FIGS. 15A through 15D are timing diagrams for a side panel according to the present invention.
Figure 15B:
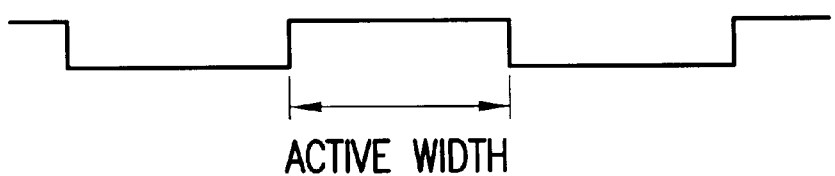
Figure 15C:
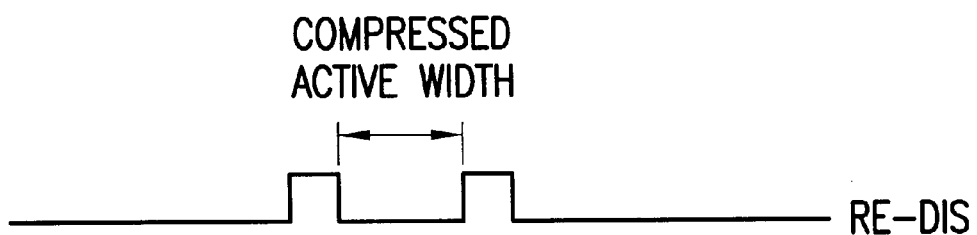
Figure 15D:
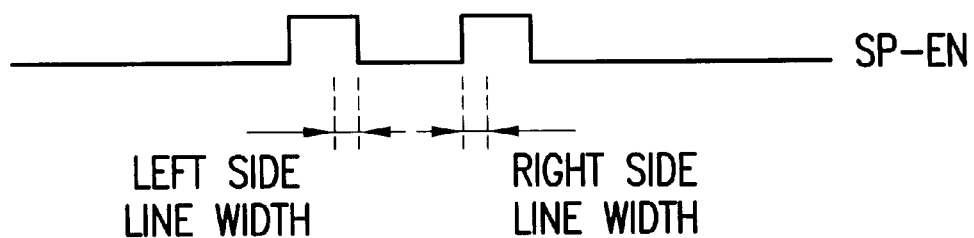

As shown in FIGS. 15A through 15D, the side panel timing according to the present invention will be explained. The active section in which a decreasing destination section is set with respect to an input video signal as shown in FIG. 15A corresponds to the section in which a video signal actually exists as shown in FIG. 15B. The read disable signal RE-DIS of the line memory is generated as shown in FIG. 15C. The read disable signal RE-DIS is a signal for prohibiting the reading of the line memory 202 when reading the side panel section for inserting the side panel. A video signal which is decreased at a ratio of 3/4 is formed between the signals RE-DIS. As shown in FIG. 15D, the side panel enable signal SP-EN includes the read disable signal RE-DIS for smoothing the section variation by covering an edge portion of the active section of the video signal decreased.

Although the preferred embodiments of the present invention have been disclosed for illustrative purpose, those skilled in the art will appreciate that various modifications, additions and substitutions are possible, without departing from the scope and spirit of the invention as described in the accompanying claims.

What is claimed is:

1. An apparatus for converting a screen aspect ratio, comprising:

a clock generator for generating a clock signal whenever a horizontal synchronous signal is inputted;

a coefficient controller for counting the clock signal obtained by the clock generator at every sample in accordance with a horizontal compressing mode and a horizontal extending mode;

a line memory for receiving a clock signal of the clock generator as a writing/reading clock signal in accordance with the writing enable signal of the clock generator and the reading enable signal of the coefficient controller and for writing/reading at every line the image data inputted; and a sample interpolater for performing interpolation in accordance with the current image data inputted from the line memory and the previous image data and for selecting at every line the interpolated data in accordance with a coefficient by the coefficient controller.

2. The apparatus of claim 1, wherein said coefficient control means includes:

a counter for sequentially counting the clock signal generated by the clock generating means with first through third flip-flops and for generating a coefficient value of three bits;

an exclusive-OR gate for exclusively ORing lower two bit values among the coefficient values of three bits obtained by the counter;

a multiplexer for receiving and multiplexing the coefficient value of three bits generated by the counter and one bit value obtained by the exclusive-OR gate as a predetermined bit, respectively, and for outputting the multiplexing results; and enable signal generating means for logically processing lower two bit values among the coefficient values of three bits generated by the counter and the coefficient selection signal and for generating the first reading enable signal and the second writing enable signal.

3. The apparatus of claim 2, wherein said multiplexer includes:

a first selector for receiving one bit value of the exclusive-OR gate and one bit value of the first and second flip-flops as upper three bits, receiving one bit value counted by the first through third flip-flops as lower three bit values, selecting the lower three bits or upper three bits in accordance with the coefficient selection signal and outputting the selected bits as the coefficient control signal of three bits; and a second selector for selecting one bit value counted by the first and third flip-flops in accordance with the coefficient selection signal and for outputting the selected bit value as the coefficient control signal of one bit.

4. The apparatus of claim 2, wherein said enable signal generating means includes:

a first inverter for inverting the coefficient value counted by the second flip-flop;

a first NAND gate for NANDing and inverting the coefficient value of the first flip-flop, and the output and coefficient selection signal of the first inverter, and for generating the first reading enable signal;

a second inverter for inverting the coefficient selection signal; and a second NAND gate for NANDing and inverting the output of the second inverter and the coefficient value of the first and second flip-flops and for generating the second writing enable signal.

5. The apparatus of claim 1, wherein said second reading enable signal of the second line memory means is set at a high level.

6. The apparatus of claim 1, wherein said sample interpolation means includes:

a sample memory for storing at every line the image data inputted from the first line memory means;

first multiplexing means for multiplexing the previous image data inputted from the sample memory and the current image data inputted from the first line memory means in accordance with the coefficient control signal of one bit generated by the coefficient control means;

line multiplying means for multiplying coefficient values which are differently set in the current or previous image data with respect to two lines inputted from the first multiplexing means;

second multiplexing means for sequentially selecting the image data inputted from the line multiplying means, the current or previous image data inputted from the first multiplexing means, and the set value in accordance with the coefficient control signal inputted from the coefficient control means and for outputting different values; and second line memory means for summing two different image data inputted from the second multiplexing means.

7. The apparatus of claim 6, wherein said first multiplexing means includes third and fourth selectors for selecting the current image data inputted from the first line memory means in accordance with a coefficient control signal of one bit outputted from the coefficient control means or the previous image data inputted from the sample memory.

8. The apparatus of claim 7, wherein said third and fourth selectors are directed to selecting different image data in accordance with a coefficient control signal of one bit.

9. The apparatus of claim 6, wherein said line multiplying means includes:

first through fourth multipliers for multiplying the image data inputted from the first selector of the first multiplexing means by coefficient values of 1/8, 2/8, 3/8, 4/8, respectively; and fifth through eighth multipliers for multiplying the image data inputted from the second selector of the first multiplexing means by coefficient values of 4/8, 5/8, 6/8, 7/8, respectively.

10. The apparatus of claim 9, wherein said second multiplexing means includes:

a first selector for selecting at every line the current or previous image data inputted from the first selector of the first multiplexing means, and the image data multiplied by the first through fourth multipliers and the sixth through eighth multipliers in accordance with the coefficient control signal of three bits inputted from the coefficient control means; and a second selector for selecting at every line the first through third multipliers, the fifth through eighth multipliers, and the ground voltage in accordance with the coefficient control signal of three bits obtained by the coefficient control means and for outputting to a data summing means.

11. The apparatus of claim 1, wherein said sample interpolation means includes:

a sample memory for delaying the image data outputted from the first line memory means by one sample and two samples;

first multiplexing means for being switched in accordance with externally inputted luminance signal and chrominance signal, selecting the current image data directly inputted from the first line memory means and the image data delayed by two samples by the sample memory, or selecting the current image data and the image data delayed by one sample by the sample memory;

line multiplying means for multiplying the image data delayed by one sample or two samples inputted from the first multiplexing means and the current image data by different coefficient values; and second multiplexing means for multiplexing the image data inputted from the line multiplying means, the image data directly inputted from the first multiplexing means, and the ground voltage in accordance with the coefficient control signal of three bits inputted from the coefficient control means and for outputting to the data summing means.

12. The apparatus of claim 11, wherein said first multiplexing means is directed to selecting the image data delayed by one sample and the current image data when the external input signal is referred to the luminance signal and is directed to selecting the image data delayed by two samples and the current image data when the external input data is referred to the chrominance signal.

13. The apparatus of claim 12, wherein said luminance signal and chrominance signal are inputted as one bit value.

14. The apparatus of claim 11, wherein said line multiplying means includes:

first through seventh multipliers for the image data delayed by two samples selected by the first multiplexing means or the current image data by coefficient values of 1/8, 2/8, 3/8, 4/8, 5/8, 6/8, 7/8, respectively; and eight through fourteenth multipliers for multiplying the image data delayed by one sample selected by the first multiplexing means and the current image data by coefficient values of 7/8, 6/8, 5/8, 4/8, 3/8, 2/8, 1/8, respectively.

15. The apparatus of claim 14, wherein said second multiplexing means includes:

a first selector for sequentially selecting at every line the current or previous image data inputted from the first multiplexing means and the image data inputted from the first through seventh multipliers in accordance with the coefficient control signal of three bits; and a second selector for sequentially selecting at every line the previously set ground voltage, and the current or previous image data inputted from the eighth through fourteenth multipliers in accordance with the coefficient control signal of three bits.

16. The apparatus of claim 1, wherein said sample interpolation means has a predetermined interpolation ratio of 4:3, in which two image data are interpolated.

17. The apparatus of claim 1, wherein said sample interpolation means has a predetermined interpolation ratio of 7:8, in which two image data are interpolated.

18. The apparatus of claim 1, wherein the coefficient control means includes a plurality of coefficient controllers generating controlled coefficients for showing different screens.

19. The apparatus of claim 18, further comprising:

a selective unit for selecting one of the controlled coefficients generated by the coefficient controllers according to a selection signal from the clock counting means, and outputting the selected controlled coefficient to the sample interpolation means.

20. The apparatus of claim 18, wherein the controlled coefficients include the coefficient control signal.

21. An apparatus for converting a screen aspect ratio, comprising:

a video signal size converter for inputting an input video signal and outputting an output signal for a wide screen mode by adjusting a line memory and expanding or compressing the input video signal at a predetermined ratio based on a horizontal size of a screen;

an interpolator for selecting one of the predetermined video signals outputted from the video signal size converter, controlling a read/write operation of the line memory based on a changing degree of a horizontal size of the selected video signal and generating a digital output video signal in which the number of horizontal pixels is changed by a screen section; and a control signal generator for generating read enable signal enabling a field memory based on a horizontal synchronous signal and for generating selection signals according to a wide screen section, an expanded screen section and a compressed screen section, and selectively outputting the read enable signal and the selection signals to the video signal size converter and the selecter.

22. The apparatus of claim 1, wherein said interpolater includes:

a horizontal 4/3 extending apparatus for receiving an output signal from the line memory and extending the screen at a ratio of 4/3 in a horizontal direction;

a horizontal 8/7 extending apparatus for receiving an output signal from the line memory and extending the screen at a ratio of 8/7 in a horizontal direction; and a horizontal 7/8 compressing apparatus for receiving an output signal from the line memory and compressing the screen at a ratio of 7/8 in a horizontal direction.

23. An apparatus for converting a screen aspect ratio, comprising:

a horizontal size converter for outputting an output signal for a wide screen mode by adjusting a line memory and expanding or compressing an input video signal at a predetermined ratio based on a horizontal size of a screen; and an interpolator for selecting one of the predetermined video signals outputted from the video signal size converter, controlling a read/write operation of the line memory based on a changing degree of a horizontal size of the selected video signal and generating a digital output video signal in which the number of horizontal pixels is changed by a screen section.

* * * * *